United States Patent
Jung

(10) Patent No.: US 10,120,589 B2
(45) Date of Patent: Nov. 6, 2018

(54) METHOD OF ADJUSTING READ VOLTAGES APPLIED BY A NONVOLATILE MEMORY DEVICE USING INFORMATION STORED BY A READ HISTORY TABLE

(71) Applicant: Bong-Kil Jung, Seoul (KR)

(72) Inventor: Bong-Kil Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 431 days.

(21) Appl. No.: 14/881,182

(22) Filed: Oct. 13, 2015

(65) Prior Publication Data

US 2016/0132256 A1  May 12, 2016

(30) Foreign Application Priority Data

Nov. 7, 2014  (KR) .................. 10-2014-0154322

(51) Int. Cl.
| | |
|---|---|
| G06F 12/00 | (2006.01) |
| G06F 3/06 | (2006.01) |
| G06F 11/00 | (2006.01) |
| G06F 11/07 | (2006.01) |
| G06F 11/16 | (2006.01) |
| G06F 11/10 | (2006.01) |

(52) U.S. Cl.
CPC ............ *G06F 3/0614* (2013.01); *G06F 3/061* (2013.01); *G06F 3/0629* (2013.01); *G06F 3/0679* (2013.01); *G06F 11/00* (2013.01); *G06F 11/073* (2013.01); *G06F 11/0793* (2013.01); *G06F 12/00* (2013.01); *G06F 11/1092* (2013.01); *G06F 11/167* (2013.01); *G06F 2212/1032* (2013.01); *G06F 2212/214* (2013.01)

(58) Field of Classification Search
CPC ......... G06F 12/0246; G06F 2212/7201; G06F 2212/214; G06F 11/167; G06F 11/1092; G06F 2212/1032; G06F 3/0688; G11C 29/42; G11C 29/52; G11C 29/76; G11C 5/141
USPC ........................................ 711/150
See application file for complete search history.

(56) References Cited

U.S. PATENT DOCUMENTS

| | | |
|---|---|---|
| 7,411,830 B2 | 8/2008 | Takeuchi et al. |
| 7,679,133 B2 | 3/2010 | Son et al. |
| 7,742,339 B2 | 6/2010 | Rizzel et al. |

(Continued)

FOREIGN PATENT DOCUMENTS

KR  1020140071779 A  6/2014

*Primary Examiner* — Mardochee Chery
(74) *Attorney, Agent, or Firm* — Volentine, Whitt & Francos, PLLC

(57) ABSTRACT

An operating method of a nonvolatile memory system includes receiving a read request for at least one page from a host. Upon receiving the read request, read voltages are adjusted using a read history table to perform a first read operation in which data stored at the nonvolatile memory is read. An optimal read voltage set is detected when data read according to the first read operation includes an uncorrectable error, and a second read operation is performed in which the stored data is read based on the detected optimal read voltage set. The read history table is updated based on a reliability parameter indicating a characteristic of the nonvolatile memory, a characteristic of the data at the first or second read operation, the optimal read voltage, or the read history table.

20 Claims, 19 Drawing Sheets

(56) References Cited

U.S. PATENT DOCUMENTS

| | | | |
|---|---|---|---|
| 8,370,719 B2 | 2/2013 | Nelson et al. | |
| 8,456,911 B2 | 6/2013 | Yuan et al. | |
| 8,553,466 B2 | 10/2013 | Han et al. | |
| 8,559,235 B2 | 10/2013 | Yoon et al. | |
| 8,576,624 B2 | 11/2013 | Dutta et al. | |
| 8,654,587 B2 | 2/2014 | Yoon et al. | |
| 8,737,136 B2 | 5/2014 | Cometti | |
| 2011/0233648 A1 | 9/2011 | Seol et al. | |
| 2013/0080858 A1* | 3/2013 | Lee ....................... | G11C 16/26 714/773 |
| 2013/0185612 A1 | 7/2013 | Lee et al. | |
| 2014/0063967 A1 | 3/2014 | Ahn et al. | |
| 2014/0101519 A1 | 4/2014 | Lee et al. | |
| 2015/0117107 A1* | 4/2015 | Sun ....................... | G11C 16/10 365/185.12 |

\* cited by examiner

| PPN | Read History | | | |
|---|---|---|---|---|
| PAGE1 | RD_h11 | RD_h12 | ... | RD_h1m |
| PAGE2 | RD_h21 | RD_h22 | ... | RD_h2m |
| PAGE3 | RD_h31 | RD_h32 | ... | RD_h3m |
| ⋮ | ⋮ | ⋮ | | ⋮ |
| PAGEn | RD_hn1 | RD_hn2 | ... | RD_hnm |

METHOD OF ADJUSTING READ VOLTAGES APPLIED BY A NONVOLATILE MEMORY DEVICE USING INFORMATION STORED BY A READ HISTORY TABLE

CROSS-REFERENCE TO RELATED APPLICATIONS

The present application claims priority under 35 U.S.C. § 119 to Korean Patent Application No. 10-2014-0154322 filed on Nov. 7, 2014, in the Korean Intellectual Property Office, the entire contents of which are hereby incorporated by reference.

BACKGROUND

Embodiments of the application described herein relate to a semiconductor memory, and more particularly, relate to a nonvolatile memory device, a memory controller, and a nonvolatile memory system including the nonvolatile memory device and the memory controller.

A semiconductor memory device is a storage device which is fabricated using semiconductors such as, but not limited to, silicon (Si), germanium (Ge), gallium arsenide (GaAs), and indium phosphide (InP). Semiconductor memory devices are classified into a volatile memory and a nonvolatile memory.

The volatile memory may lose contents stored therein at power-off. The volatile memory includes the following: a static RAM (SRAM), a dynamic RAM (DRAM), and a synchronous DRAM (SDRAM). The nonvolatile memory may retain stored contents even at power-off. The nonvolatile memory includes the following: a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

The flash memory is used in various fields thanks to the following advantages: mass storage, low noise, and low power. The flash memory stores data by changing threshold voltages of memory cells. The flash memory device reads stored data by sensing threshold voltages of memory cells using predetermined read voltages. An error may occur at data stored at the flash memory device due to various factors. In recent years, there have been developed various techniques for recovering such errors.

SUMMARY

Embodiments of the application relate to increasing the probability that a read pass occurs at a read operation using a read history, by applying a weight based on a parameter of a nonvolatile memory system and updating a read history table, thereby improving the reliability and performance of a nonvolatile memory device and a memory controller.

One aspect of embodiments of the application is directed to providing an operating method of a nonvolatile memory system which includes a nonvolatile memory having a plurality of pages and a memory controller configured to read data stored on at least one of the pages based on a plurality of read voltages. The operating method includes receiving a read request on the at least one page from a host. Upon receiving the read request, the read voltages are adjusted using a read history table to perform a first read operation in which data stored at the nonvolatile memory is read. An optimal read voltage set is detected when data read according to the first read operation includes an uncorrectable error, and a second read operation is performed in which the stored data is read based on the detected optimal read voltage set. The read history table is updated based on a reliability parameter indicating a characteristic of the nonvolatile memory or a characteristic of the data at the first or second read operation, the optimal read voltage, and the read history table.

The reliability parameter may include at least one of the number of error bits of data read using the optimal read voltage set, a temperature of the nonvolatile memory, a program/erase (P/E) cycle of the nonvolatile memory, an address indicating a position of the at least one page, or a read count of the at least one page.

The read history table may include information associated with history read voltage sets corresponding to the pages. The adjusting of the read voltages may include selecting a history read voltage set corresponding to the at least one page; adjusting the read voltages with the selected history read voltage set; and reading the at least one page using the adjusted read voltages.

The history read voltage set may indicate a read voltage set that is read-passed at a read operation performed before the first and second read operations.

The updating of the read history table may include updating the read history table by applying a first weight to the optimal read voltage set depending on the reliability parameter and applying at least one second weight to at least one history read voltage set associated with the at least one page.

The at least one second weight may decrease when the first weight increases and may increase when the first weight decreases.

The performing of a second read operation may include reading the at least one page at least twice; and detecting the optimal read voltage set based on the read result.

The performing of a second read operation may include detecting the optimal read voltage set based on a predetermined table including a plurality of read voltage sets.

The operating method may further include receiving another read request associated with the at least one page from the host; and upon receiving the other read request, adjusting the read voltages according to the updated read history table to read the data.

The read history table may be managed by one selected from a group of a plane unit, a memory block unit, a sub block unit, a word line unit, and a page unit of the nonvolatile memory device.

The nonvolatile memory includes a three-dimensional memory array comprising a plurality of memory cells, each of the memory cells including a charge trap layer.

Another aspect of embodiments of the application is directed to providing an operating method of a memory controller which controls a nonvolatile memory. The operating method includes reading data stored at the nonvolatile memory based on a plurality of read voltages. The read voltages are adjusted according to a read history table and a first reliability parameter to read the data according to the adjusted read voltages, when the read data includes an uncorrectable error. An optimal read voltage set is detected when data read using the adjusted read voltages includes an uncorrectable error. The read history table is updated according to the detected optimal read voltage set, a second reliability parameter, and the read history table.

The first reliability parameter may include at least one of the number of error bits of data read using the read voltages, a temperature of the nonvolatile memory, a program/erase (P/E) cycle of the nonvolatile memory, an address indicating a position of the at least one page, or a read count of the at least one page. The second reliability parameter may include at least one of the number of error bits of data read using the optimal read voltage set, the temperature of the nonvolatile memory, the program/erase (P/E) cycle of the nonvolatile memory, the address indicating a position of the at least one page, or the read count of the at least one page.

The read history table may include information associated with history read voltage sets corresponding to an area where the data is stored. The adjusting of the read voltages may include applying a weight, based on the first reliability parameter, to the history read voltage set to adjust the read voltages.

Data read using the optimal read voltage set may be normal data or data including a correctable error.

The detecting of an optimal read voltage set may include detecting the optimal read voltage set of the read voltages by sequentially performing a read operation based on a predetermined table including a plurality of read voltage sets.

The detecting of an optimal read voltage set may include reading the data at least twice using different read voltage sets; and detecting the optimal read voltage set based on the read result.

Another aspect of embodiments of the application is directed to providing an operating method of a nonvolatile memory device which includes a plurality of pages and an error correction circuit configured to correct an error of data. The operating method includes receiving a read command from a memory controller. Upon receiving the read command, data stored on at least one of the pages is read based on a plurality of read voltages. The read voltages are adjusted according to a read history table to read data stored at the at least one page according to the adjusted read voltages, when the read data includes an error uncorrectable by the error correction circuit. An optimal read voltage set is detected when data read using the adjusted read voltages includes an error uncorrectable by the error correction circuit. The read history table is updated based on the detected optimal read voltage set, a reliability parameter, and the read history table.

The reliability parameter may include at least one of the number of error bits of data read using the optimal read voltage set, a temperature of the nonvolatile memory, a program/erase (P/E) cycle of the nonvolatile memory, an address indicating a position of the at least one page, or a read count of the at least one page.

When one piece of data of the read data is data including a correctable error or normal data, the one piece of data may be sent to the memory controller.

The detecting of an optimal read voltage set may include reading the data at least twice based on a plurality of read voltage sets; and detecting the optimal read voltage based on the read result.

Another aspect of embodiments of the application is directed to providing a method of operating a nonvolatile memory device. The method includes: receiving, from a host device, a read request for data stored in a page of memory cells of the nonvolatile memory; translating an address, for the page, within the read request to an identification of signal lines for addressing the page of memory cells; reading data from the page of memory cells by applying read voltages to the identified signal lines; and storing, within a read history table (RHT), values indicative of the read voltages for the page of memory.

Values of the read voltages applied in reading the data from the page of memory cells are obtained from the RHT.

Values of the read voltages applied in reading the data from the page of memory cells are obtained in accordance with values of read voltages obtained from the RHT modified in accordance with a reliability parameter of the nonvolatile memory device.

The stored values are the read voltages applied in reading the data from the memory cells modified in accordance with a reliability parameter of the nonvolatile memory device.

The stored values are the read voltages applied in reading the data from the memory cells modified in accordance with a reliability parameter of the nonvolatile memory device and values indicative of read voltages, for the page of memory cells, previously stored in the RHT.

The stored values are derived from the sum of: (1) the read voltages applied in reading the data from the memory cells multiplied by a first reliability parameter of the nonvolatile memory device and (2) values indicative of read voltages, for the page of memory cells, previously stored in the RHT multiplied by a second reliability parameter of the nonvolatile memory device.

Another aspect of embodiments of the application is directed to providing a memory system for operating a nonvolatile memory device. The system includes an address decoder that receives, from a host device, a read request for data stored in a page of memory cells of the nonvolatile memory and translates an address, for the page, within the read request to an identification of signal lines for addressing the page of memory cells. A control circuit applies read voltages to a first subset of the identified signal lines, via the address decoder. An input/output (I/O) circuit reads data, through a second subset of the identified signal lines, from the page of memory cells based upon the read voltages applied to the first subset of identified signal lines. A storage circuit stores, within a read history table (RHT), values indicative of the read voltages applied for reading the page of memory.

Values of the read voltages applied in reading the data from the page of memory cells are obtained from the RHT.

Values of the read voltages applied in reading the data from the page of memory cells are obtained in accordance with values of read voltages obtained from the RHT modified in accordance with a reliability parameter of the nonvolatile memory device.

The stored values are the read voltages applied in reading the data from the memory cells modified in accordance with a reliability parameter of the nonvolatile memory device.

The stored values are the read voltages applied in reading the data from the memory cells modified in accordance with a reliability parameter of the nonvolatile memory device and values indicative of read voltages, for the page of memory cells, previously stored in the RHT.

BRIEF DESCRIPTION OF THE FIGURES

Preferred embodiments of the application will be described below in more detail with reference to the accompanying drawings. The embodiments of the application may, however, be embodied in different forms and should not be construed as limited to the embodiments set forth herein. Rather, these embodiments are provided so that this disclosure will be thorough and complete, and will fully convey the scope of the application to those skilled in the art. Like numbers refer to like elements throughout.

FIGS. 11 and 12 are diagrams for describing a method for updating a read history table according to still another exemplary embodiment of the application.

DETAILED DESCRIPTION

Figure 1:
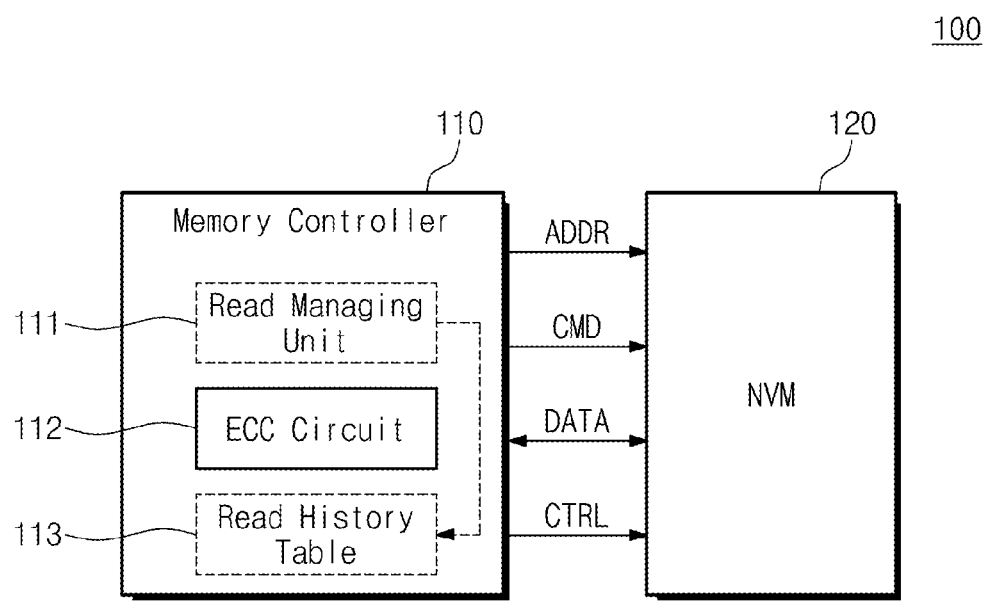
FIG. 1 is a block diagram schematically illustrating a nonvolatile memory system according to an exemplary embodiment of the application.

Detailed example embodiments of the application are disclosed herein. However, specific structural and functional details disclosed herein are merely representative for purposes of describing example embodiments of the application. Example embodiments of the application may, however, be embodied in many alternative forms and should not be construed as limited to only the embodiments set forth herein.

Accordingly, while example embodiments of the application are capable of various modifications and alternative forms, embodiments thereof are shown by way of example in the drawings and will herein be described in detail. It should be understood, however, that there is no intent to limit example embodiments of the application to the particular forms disclosed, but to the contrary, example embodiments of the application are to cover all modifications, equivalents, and alternatives falling within the scope of example embodiments of the application. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the application. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the application. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which application belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating a nonvolatile memory system according to an exemplary embodiment of the application. Referring to FIG. 1, a nonvolatile memory system 100 contains a memory controller 110 and a nonvolatile memory device 120. Each of the memory controller 110 and the nonvolatile memory device 120 may be implemented in a chip, a package, or a device. Alternatively, the nonvolatile memory system 100 may be implemented as a storage device, a memory card, or a memory stick.

The memory controller 110 writes data at the nonvolatile memory device 120 or reads data from the nonvolatile memory device 120 in response to a request of an external device (e.g., host or application processor). For example, the memory controller 110 provides the nonvolatile memory device 120 with an address ADDR, a command CMD, and a control signal CTRL for the data writing or reading operations.

The nonvolatile memory device 120 exchanges data, DATA, with the memory controller 110 in response to signals from the memory controller 110. In exemplary embodiments, the nonvolatile memory device 120 may be implemented with the following nonvolatile memory devices: EPROM (Electrically Erasable and Programmable ROM), NAND flash memory, NOR flash memory, PRAM (Phase-change RAM), ReRAM (Resistive RAM), FRAM (Ferroelectric RAM), and STT-MRAM (Spin-Torque Magnetic RAM). For the sake of easy understanding, it is assumed that the nonvolatile memory device 120 is a NAND flash memory.

The memory controller 110 contains a read managing unit 111, an error correction code (ECC) circuit 112, and a read history table (RHT) 113. The read managing unit 111 manages and adjusts read voltages for reading data stored at the nonvolatile memory device 120. For example, when data read from the nonvolatile memory device 120 is uncorrectable by the ECC circuit 112, the read managing unit 111 may adjust a plurality of read voltages that the nonvolatile memory device 120 will use. In exemplary embodiments, the read managing unit 111 may adjust the read voltages based on the read history table 113. In exemplary embodiments, the read managing unit 111 may read data stored at the nonvolatile memory device 120 at least twice and may adjust the read voltage based on the read data.

The ECC circuit 112 detects and corrects an error of data read from the nonvolatile memory device 129. For example, the ECC circuit 112 generates an error correction code with respect to data to be stored at the nonvolatile memory device 120. The error correction code thus generated is stored at the nonvolatile memory device 120 together with data. The ECC circuit 112 detects and corrects an error of data read from the nonvolatile memory device 120, based on the error correction code associated with the read data. In exemplary embodiments, the ECC circuit 112 may have predetermined error correction capacity. Data that includes error bits (or, fail bits) of which the number gets out of the error correction capability of the ECC circuit 112 may be referred to as "Uncorrectable ECC (UECC) data". If data read from the nonvolatile memory device 120 is the UECC data, then the read managing unit 111 may adjust a plurality of read voltages to perform a read operation again.

The read history table 113 may include histories of previous read voltages. For example, the read history table 113 may contain information on read voltages that are read-passed at a previous read operation. In exemplary embodiments, the read pass may mean that data read using specific read voltages is normal data not including an error or the case that an error included in data read using specific read voltages is correctable by the ECC circuit 112.

In exemplary embodiments, the read managing unit 111 may adjust a plurality of read voltages based on the read history table 113. That is, read voltages may be adjusted based on read voltages that are previously read-passed, and data may be read using the adjusted read voltages. Thus, the chance that an error of read data is corrected by the ECC circuit 112 may become higher. That is, since the probability that read pass becomes higher, the performance of the nonvolatile memory system may be improved.

For the sake of easy understanding, below, it is assumed that read voltages that are stored and managed in the read history table 113 and are previously read-passed are referred to as "history read voltages".

In exemplary embodiments, the read history table 113 may contain information about history read voltages of respective pages of the nonvolatile memory device 120. In other words, the read history table 113 may include information of read voltages that are previously read-passed with respect to each page. However, the scope and spirit of the application may not be limited thereto. For example, the read history table 113 may manage history read voltages by the following units: a plane, a memory block, a super block, a sub block, a word line, or a page.

The read managing unit 111 updates the read history table 113. For example, the read managing unit 111 may detect optimal read voltages. The optimal read voltages may mean read voltages that are read-passed upon reading data. In exemplary embodiments, the read managing unit 111 may read data from the nonvolatile memory device 120 at least twice and may detect optimal read voltages based on the read data.

The read managing unit 111 updates the read history table 113 based on optimal read voltages and a parameter. In other words, the read managing unit 111 may apply a parameter-based weight to optimal read voltages to update the read history table 113. At a next read operation, the read managing unit 111 may adjust a plurality of read voltages based on the read history table 113 thus updated.

In exemplary embodiments, the parameter may include the following factors indicating the reliability (i.e., probability that read voltages are read-passed at a read operation) of optimal read voltages: the number of error bits of data read using optimal read voltages, the temperature of the nonvolatile memory device 120, a program and erase (P/E) count of the nonvolatile memory device 120, addresses (i.e., physical location) of the nonvolatile memory device 120, and a read count of the nonvolatile memory device 120. For the sake of easy understanding, below, the above-described factors may be referred to as "reliability parameter".

In other words, the reliability parameter may indicate a data characteristic or a physical characteristic of the nonvolatile memory device 120 when a read operation is currently performed.

A characteristic (i.e., threshold voltages of memory cells) of the nonvolatile memory device 120 may vary with the above-described reliability parameter. Thus, since the read managing unit 111 updates the read history table 113 by applying weight to optimal read voltages based on a reliability parameter, the probability that read voltages are read-passed may become higher if read voltages are adjusted at a next read operation based on the read history table 113. A method for updating the read history table 113 will be more fully described with reference to accompanying drawings.

Figure 2:
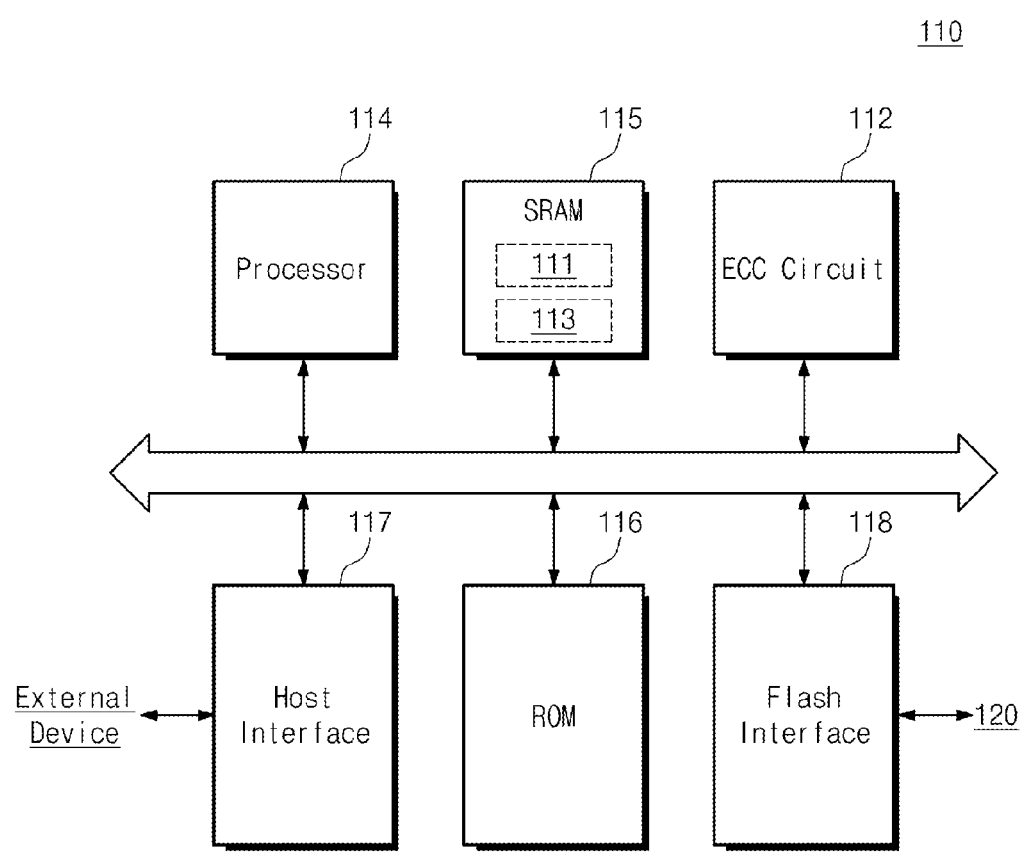
FIG. 2 is a block diagram schematically illustrating a memory controller shown in FIG. 1.

FIG. 2 is a block diagram schematically illustrating a memory controller shown in FIG. 1. Referring to FIGS. 1 and 2, a memory controller 110 contains an ECC circuit 112, a processor 114, an SRAM 115, a ROM 116, a host interface 117, and a flash interface 118.

The processor 114 controls an overall operation of the memory controller 110. The SRAM 115 may be used as a buffer memory, a cache memory, and a working memory of the memory controller 110.

In exemplary embodiments a read managing unit 111 and a read history table 113 may be provided in the form of software. The read managing unit 111 and the read history table 113 are stored at the SRAM 115 and may be driven by the processor 114.

The read managing unit 111 and the read history table 113 may be stored at a meta-area (not shown) of a nonvolatile memory device 120 and may be then loaded on the SRAM 115. The read managing unit 111 and the read history table 113 loaded on the SRAM 115 may be driven by the processor 114. The read history table 113 may be flushed into the nonvolatile memory device 120 periodically, randomly, or during a background operation.

A ROM 116 stores various pieces of information needed to operate the memory controller 110 in the form of firmware. In exemplary embodiments, the read managing unit 111 may be implemented in the form of firmware, may be stored at the ROM 116, and may be driven by the processor 114.

The memory controller 110 may communicate with an external device (e.g., host or application processor) through the host interface 117. In exemplary embodiments, the host interface 117 may be implemented with at least one of the following interfaces: an Universal Serial Bus (USB), a multimedia card (MMC), an embedded-MMC, a peripheral component interconnection (PCI), a PCI-express, an Advanced Technology Attachment (ATA), a Serial-ATA, a Parallel-ATA, a small computer small interface (SCSI), a enhanced small disk interface (ESDI), an Integrated Drive Electronics (IDE), a Mobile Industry Processor Interface (MIPI), a Nonvolatile Memory-express (NVM-e), and an Universal Flash Storage (UFS).

The memory controller 110 communicates with the nonvolatile memory device 120 through the flash interface 118. The memory controller 110 provides the nonvolatile memory device 120 with a command, an address, and a control signal through the flash interface 118 and may exchange data with the nonvolatile memory device 120. In exemplary embodiments, the flash interface 118 may include a NAND interface.

Figure 3:
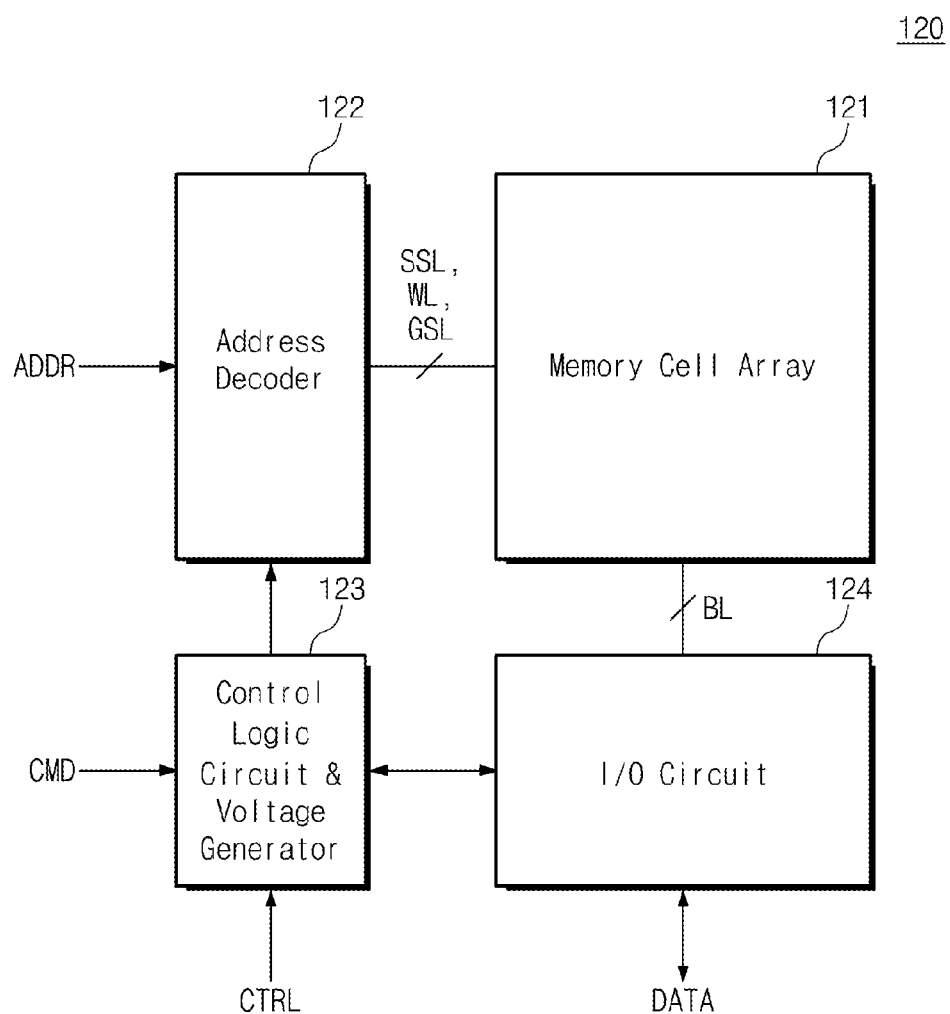
FIG. 3 is a block diagram schematically illustrating a nonvolatile memory device shown in FIG. 1.

FIG. 3 is a block diagram schematically illustrating a nonvolatile memory device shown in FIG. 1. Referring to FIG. 3, a nonvolatile memory device 120 includes a memory cell array 121, an address decoder 122, a control logic circuit and voltage generator block 123, and an input/output circuit 124.

The memory cell array 121 contains a plurality of memory blocks, each of which has a plurality of pages. Each page may include a plurality of memory cells. Each memory cell is a single level cell (SLC) storing one bit or a multi-level cell (MLC) storing at least two bits. In exemplary embodiments, each memory block may be formed in a direction perpendicular to a substrate, that is, may have a three-dimensional vertical stack structure. In exemplary embodiments, each of the memory cells may be a charge trap flash memory cell. In exemplary embodiments, the memory cells included in pages may be connected with word lines, respectively.

The address decoder 122 is connected to the memory cell array 121 through string selection lines SSL, the word lines WL, and ground selection lines GSL. The address decoder 122 decodes an address ADDR received from a memory controller 110 to drive the string selection lines SSL, the word lines WL, and the ground selection lines GSL. For example, the address decoder 122 decodes the address ADDR to select at least one of the word lines WL. The address decoder 122 may control a voltage of a selected word line according to a control of the control logic circuit and voltage generator block 123.

The control logic circuit and voltage generator block 123 controls the address decoder 122 and the input/output circuit 124 in response to a command CMD and a control signal CTRL from the memory controller 110. For example, the control logic circuit and voltage generator block 130 controls the address decoder 122 and the input/output circuit 124 such that data is written at the memory cell array 121 or read from the memory cell array 121.

The control logic circuit and voltage generator block 123 generates various voltages needed for the nonvolatile memory device 110 to operate. For example, the control logic circuit and voltage generator block 123 may generate various voltages including the following: a plurality of selection read voltages, a plurality of non-selection read voltages, a plurality of program voltages, a plurality of pass voltages, a plurality of erase voltages, a plurality of verification voltages, a plurality of erase verification voltages, and etc. The control logic circuit and voltage generator block 123 may adjust a plurality of selection read voltages (i.e., read voltages) according to a control of the memory controller 110.

The input/output circuit 124 is connected to the memory cell array 121 through bit lines BL. The input/output circuit 124 receives data, DATA, from the memory controller 110 and may adjust voltages of the bit lines such that the received data is written at the memory cell array 121. Alternatively, based on a control of the control logic circuit and voltage generator block 123, the input/output circuit 124 controls the bit lines to read data stored at the memory cell array 121.

In exemplary embodiments, the input/output circuit 124, although not shown in figure, may contain the following: a page buffer (or, a page register), a column selector, and a data buffer. In other exemplary embodiments, the input/output circuit 124 may contain the following: a sense amplifier, a write driver, a column selector, and a data buffer.

In an embodiment of the present application, the nonvolatile memory device 120 may include a three dimensional (3D) memory array. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present application, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Figure 4:
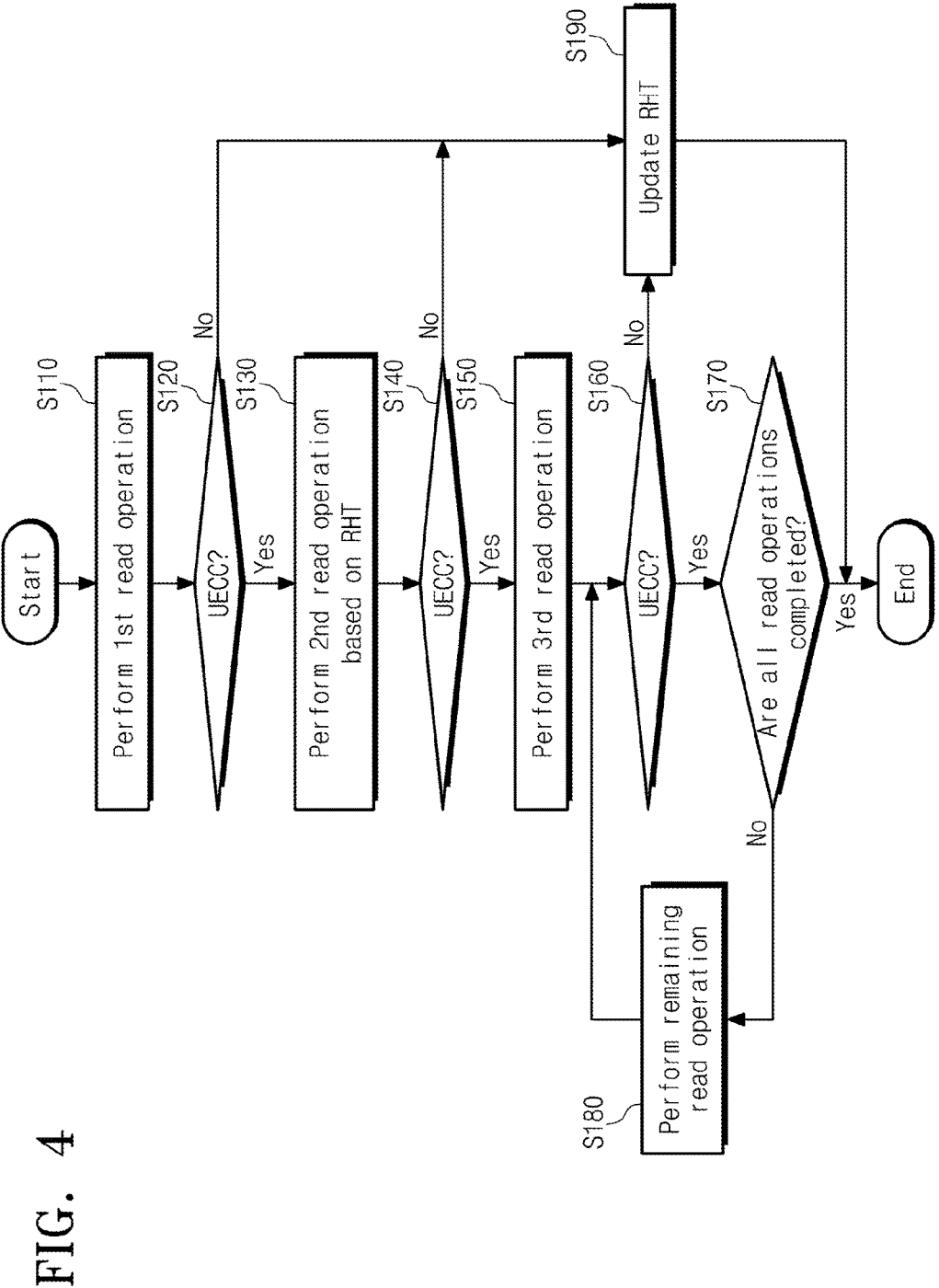
FIG. 4 is a flow chart showing an operating method of a memory controller shown in FIG. 1.

FIG. 4 is a flow chart showing an operating method of a memory controller shown in FIG. 1. A read method of a nonvolatile memory system 100 will be more fully described with reference to FIG. 4. For the sake of easy understanding, it is assumed that a memory controller 110 reads a first page PAGE1 of a plurality of pages included in a nonvolatile memory device 120. However, the scope and spirit of the application may not be limited thereto.

Referring to FIGS. 1 and 4, in step S110, a memory controller 110 performs a first read operation. For example, the memory controller 110 receives a read request from an external device (e.g., host or application processor) to perform the first read operation. In exemplary embodiments, the first read operation may indicate a default read operation. For example, the memory controller 110 may read data stored at the first page PAGE1 based on a predetermined default read voltage set. The memory controller 110 detects and corrects an error of data that is read according to the first read operation. For example, the error detection and correction may be performed by an ECC circuit 112.

In step S120, the memory controller 110 determines whether the read data is UECC data. For example, in step S110, the memory controller 110 may detect and correct an error of the read data. At this time, an error of the read data may get out of an error correction range of the ECC circuit 112. As described above, data that includes error bits of which the number exceeds the error correction range of the ECC circuit 112 may be referred to as "UECC data".

When data read according to the first read operation is UECC data, in step S130, the memory controller 110 performs a second read operation based on a read history table 113. In exemplary embodiments, the second read operation may indicate a read operation that is performed based on a history read voltage set. For example, the memory controller 110 may adjust read voltages of a nonvolatile memory device 120, based on a history read voltage set, corresponding to the first page PAGE1, from among history read voltage sets that the read history table 113 includes. The memory controller 110 reads data stored at the first page PAGE1 based on the adjusted read voltages. The memory controller 110 detects and corrects an error of data that is read through the second read operation. In exemplary embodiments, the second read operation may be performed in response to the read request from the external device (refer to the step S110).

In step S140, the memory controller 110 determines whether the data read according to the second read operation is UECC data. In the event that the data read according to the second read operation is UECC data, in step S150, the memory controller 110 performs a third read operation. The memory controller 110 detects and corrects an error of data read through the third read operation.

In exemplary embodiments, the third read operation may include a series of operations for searching for optimal read voltages. For example, the third read operation may include the following read operations: a read operation based on a predetermined table PDT, a valley search operation, and etc. The read operation that is based on the predetermined table PDT may indicate an operation in which a first page is read by sequentially using read levels of the predetermined table PDT. The valley search operation may indicate an operation in which the first page is read at least twice and an optimal read level is selected based on the read result.

In exemplary embodiments, the third read operation may have higher reliability (i.e., the probability that read pass occurs is high) than the first and second read operations. However, since the first page is read at least twice or more, the third read operation may cause an increase in overhead as compared with the first and second read operations.

When data read through the third read operation is determined to be UECC data (step S160), in step S170, the memory controller 110 determines whether all read operations are completed. If all read operations are completed, then the memory controller 110 ends the read operation. Otherwise, the method proceeds to step S180 for the memory controller 110 to perform remaining read operations. In exemplary embodiments, the remaining read operations may be performed in the same manner as the third read operation or in a manner different from the third read operation.

When read pass occurs in one of steps S120, S140, and S160 (i.e., when an error of read data is corrected by the ECC circuit 112), in step S190, the memory controller 110 updates the read history table 113 based on read-passed read voltages (i.e., optimal read voltages) and a reliability parameter.

For example, there may be determined in step S120 that data read through the first read operation is not UECC data. On this occasion, read voltages that are used during the first read operation may be read-passed read voltages (i.e., optimal read voltages). The memory controller 110 updates history read voltages of the read history table 113 corresponding to the first page, based on the optimal read voltages and the reliability parameter.

For the sake of easy understanding, below, a read-passed read voltage or read voltage sets (i.e., read voltage capable of reading data including an error belonging to the error correction range of the ECC circuit 112) may be referred to as an "optimal read voltage" or "optimal read voltage set".

In exemplary embodiments, the memory controller 110 determines a weight based on the reliability parameter and applies the weight to optimal read voltages to update the read history table 113. The reliability parameter may include the following factors: the number of error bits corrected by the ECC circuit 112, a read count, a program and erase (P/E) cycle, or an address (i.e., a physical location) of the first page (i.e., selected page), or a read count, a P/E cycle, or a temperature of the nonvolatile memory device 120.

For example, as the number of fail bits corrected by the ECC circuit 112 increases, the reliability (i.e., the probability that read pass occurs during the following read operation) of optimal read voltages may decrease. On this occasion, the memory controller 110 may decrease a weight to be applied to optimal read levels. In contrast, as the number of fail bits corrected by the ECC circuit 112 decreases, the reliability (i.e., the probability that read pass occurs during the following read operation) of optimal read voltages may increase. On this occasion, the memory controller 110 may increase a weight to be applied to optimal read levels.

Similarly, the memory controller 110 may determine a weight based on the following factors: the number of error bits corrected by the ECC circuit 112, a read count, a P/E cycle, or an address of the first page (i.e., selected page), or a read count, a P/E cycle, or a temperature of the nonvolatile memory device 120.

As the memory controller 110 updates the read history table 113 by applying weight to optimal read levels based on a reliability parameter, the probability that read pass occurs upon performing the following second read operation using the read history table 113 may increase, thereby preventing execution of the third read operation. This may mean that overhead due to the third read operation is reduced.

FIGS. 5 through 8 are diagrams for describing an operating method of FIG. 4. For the sake of easy understanding, below, it is assumed that memory cells of a nonvolatile memory device 120 are triple level cells (TLC). Also, it is assumed that a first page PAGE1 is a page selected for a read operation. However, the scope and spirit of the application may not be limited thereto. Change or modification on the scope and spirit of the application may be variously made.

Figure 5:
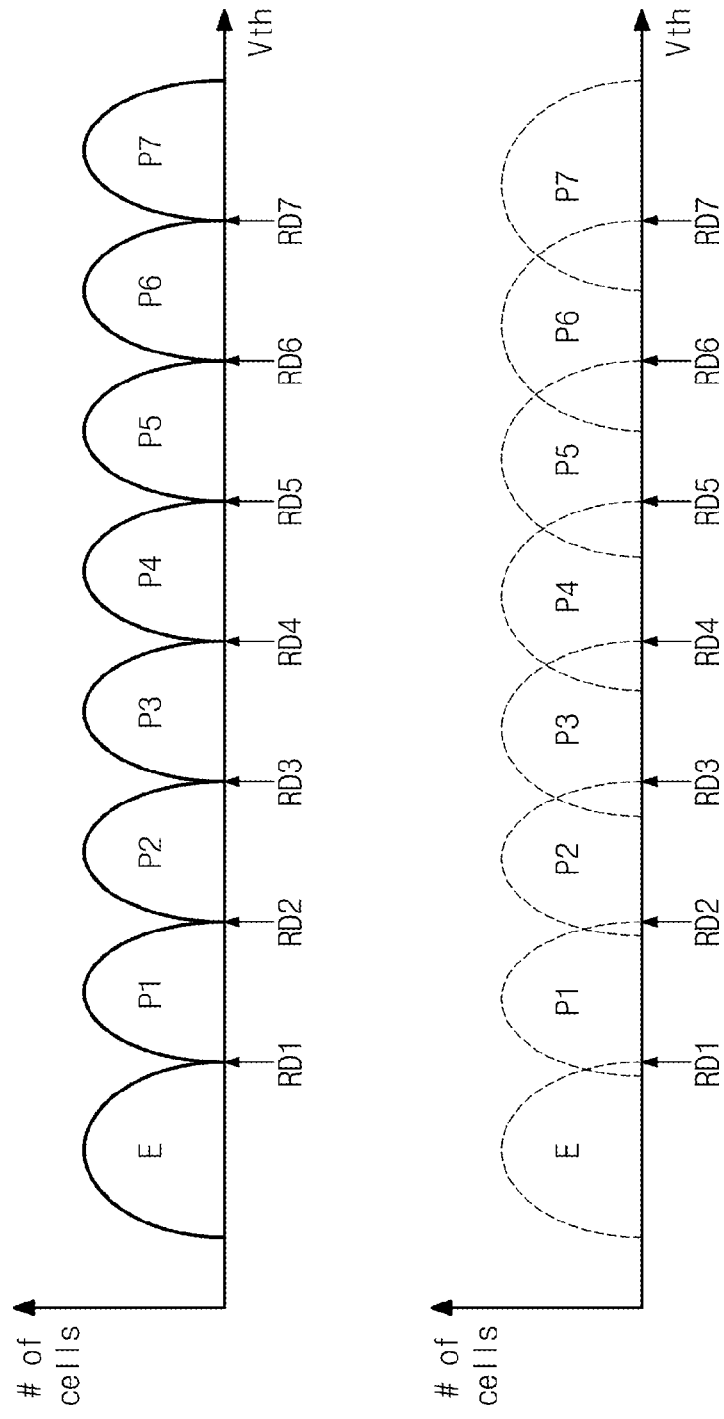
FIGS. 5 through 8 are diagrams for describing an operating method of FIG. 4.

Referring to FIGS. 1 and 5, each memory cell of the nonvolatile memory device 120 is programmed to have one of an erase state E and first through seventh program states P1 through P7. The nonvolatile memory device 120 may read data by determining states of memory cells based on a plurality of read voltages RD1 through RD7 under a control of a memory controller 110.

Threshold voltages of memory cells vary with various factors such as lapse of time and interference between adjacent cells. On this occasion, data that is read based on the read voltages RD1 through RD7 may include an error. The memory controller 110 detects and corrects an error of the read data. If a variation in a threshold voltage distribution of memory cells increases, data may include an error that exceeds an error correction range of an ECC circuit 112. On this occasion, the memory controller 110 may perform a read operation based on an operating method described with reference to FIG. 4.

Figure 6:
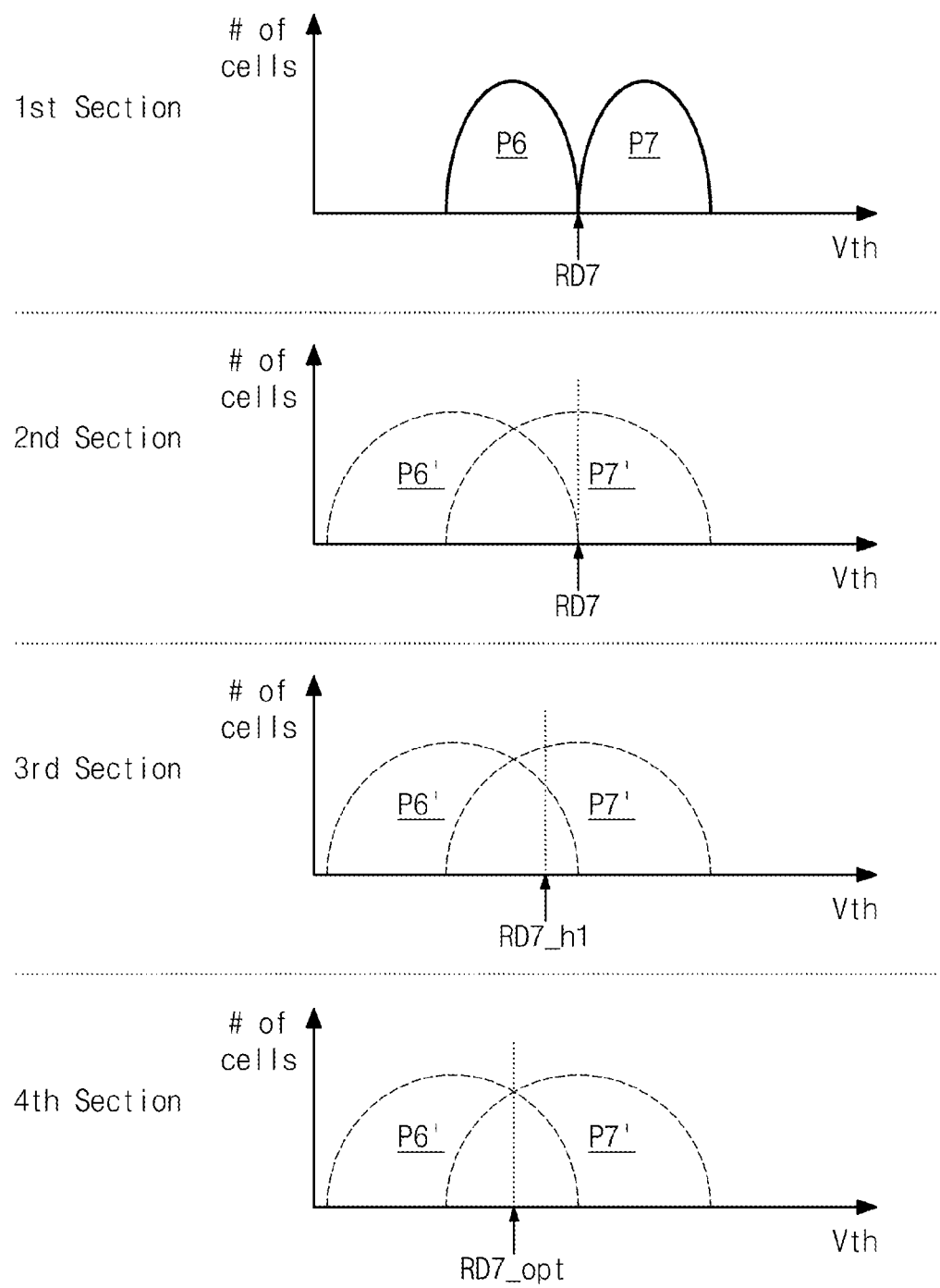

Below, a read operation will be described with reference to FIG. 6. In FIG. 6, threshold voltage distributions of some program states are only illustrated for the sake of easy understanding, and a read operation will be described based on a read voltage (i.e., a seventh read voltage). However, the scope and spirit of the application may not be limited thereto. Other read levels may be also selected or adjusted according to a similar method. Referring to FIGS. 1 and 4 and a first section of FIG. 6, a part of memory cells of the first page PAGE1 may have a sixth or seventh program state P6 or P7.

Afterwards, as a program time elapses, threshold voltages of some memory cells of the first page PAGE1 may be changed as illustrated in a second section of FIG. 6. At this time, a nonvolatile memory system 100 may perform a read operation with respect to the first page PAGE1. For example, to determine memory cells, having a seventh program state P7', from among memory cells of the first page PAGE1, a memory controller 110 performs a read operation based on the seventh read voltage RD7. In exemplary embodiments, a read operation (i.e., first read operation) that is performed based on a distribution diagram illustrated in the second section of FIG. 6 may correspond to step S110 that is described with reference to FIG. 4.

Data that is read as the memory controller 110 performs a read operation based on a seventh read level RD7 may be UECC data. For example, as illustrated in the first section of FIG. 6, when the seventh read level RD7 is a valley value of threshold voltage distributions of the sixth and seventh program states P6 and P7, data that is read based on the seventh read voltage RD7 may not include an UECC error. However, as illustrated in the second section of FIG. 6, when the seventh read level RD7 is not a valley value of threshold voltage distributions of the sixth and seventh program states P6 and P7, data that is read based on the seventh read voltage RD7 may include an UECC error.

In this case, as illustrated in a third section of FIG. 6, the memory controller 110 performs a read operation based on a history read voltage RD7_h1. In exemplary embodiments, a read operation (i.e., second read operation) that is performed based on a threshold voltage distribution diagram shown in the third section of FIG. 6 may correspond to step S130 that is described with reference to FIG. 4.

Figures 7, 8:
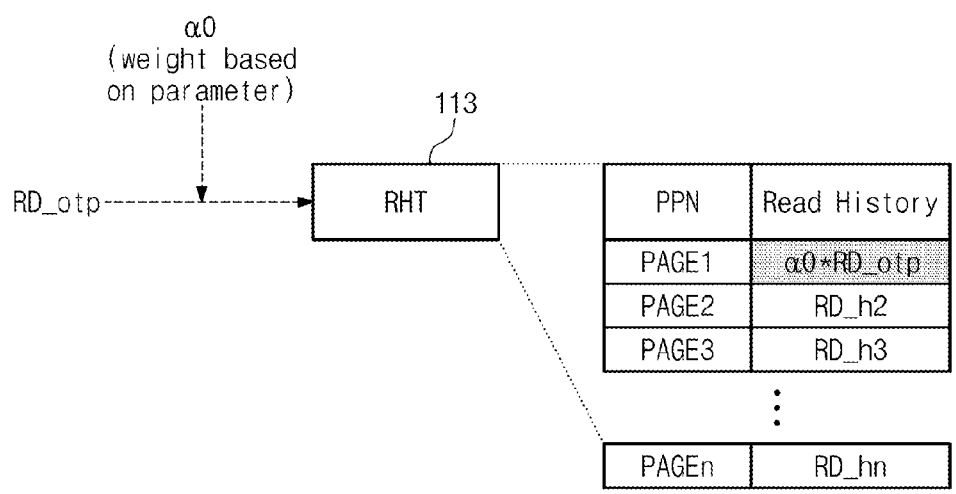

For example, the memory controller 110 includes a read history table 113 which is illustrated in FIG. 7. The read history table 113 includes physical page numbers PPN and history read voltage sets RD_h1 through RD_hn corresponding to the physical page numbers PPN. The history read voltage sets RD_h1 through RD_hn may indicate read voltage sets that are read-passed with respect to pages PAGE1 through PAGEn at a previous read operation.

The memory controller 110 adjusts read voltages using a history read voltage set RD_h1 corresponding to a selected page (i.e., the first page) and performs a read operation. In exemplary embodiments, the history read voltage set RD_h1 may include a plurality of read voltages, and a history read voltage RD7_h1 may be included in the history read voltage set RD_h1. The memory controller 110 detects and corrects an error of data that is read based on the history read voltage set RD_h1. As described above, however, data that is read using the history read voltage RD7_h1 may be UECC data.

On this occasion, the memory controller 110 performs a third read operation that is described with reference to step S150 of FIG. 4. For example, the memory controller 110 may search for an optimal read voltage RD7_opt based on a predetermined table. Alternatively, the memory controller 110 may search for the optimal read voltage RD7_opt through a valley search operation. The memory controller 110 performs a read operation based on the optimal read voltage RD7_opt thus selected, as illustrated in the fourth section of FIG. 6. The memory controller 110 detects and corrects an error of data that is read based on the optimal read voltage RD7_opt.

An embodiment of the application is exemplified through a circumstance in which data read through first and second read operations is UECC data. However, when data read through the first and second read operations is not UECC data, read levels that are used at the first or second read operation may be optimal read voltages.

A nonvolatile memory system 100 performs a read operation based on operating methods described with reference to FIGS. 4 through 7 and detects optimal read voltages. Below, a method for updating a read history table 113 based on optimal read voltages detected will be described.

Referring to FIGS. 1 and 8, the memory controller 110 detects an optimal read voltage set RD_otp that is described based on operating methods described with reference to FIGS. 4 through 7. The memory controller 110 updates a read history table 113 based on the optimal read voltage set RD_otp thus detected. At this time, the memory controller 110 updates the read history table 113 by applying a reliability parameter based weight $\alpha 0$ to the optimal read voltage set RD_otp thus detected.

For example, a reliability parameter may include the number of error bits of data to be read upon reading a selected page (i.e., first page PAGE1) using the optimal read voltage set RD_otp. As the number of error bits detected increases, the memory controller 110 decreases the weight $\alpha 0$. That is, the memory controller 110 may apply a small weight because the reliability (i.e., the probability that read pass occurs at a following read operation) of the optimal read voltage set RD_otp becomes lower as the number of error bits detected increases. The memory controller 110 updates the read history table 113 such that the weighted read voltage set $\alpha 0$*RD_otp corresponds to the first page PAGE1. Afterwards, the read voltage set $\alpha 0$*RD_otp stored at the updated read history table 113 may be used as a history read voltage set of the first page PAGE1.

In exemplary embodiments, the reliability parameter may include the following factors: a P/E cycle of a selected page, a read count, or a temperature of a nonvolatile memory device 120. For example, as a P/E cycle of a selected page, a read count, or a temperature increases, the weight $\alpha 0$ may decrease. As a P/E cycle of a selected page, a read count, or a temperature decreases, the weight $\alpha 0$ may increase.

In exemplary embodiments, the reliability parameter may include a factor such as an address of a selected page. The address may indicate a physical position of the selected page. A weight $\alpha 0$ may vary with a physical position of the selected page. For example, a relatively small weight $\alpha 0$ may be applied to pages that are placed at edges of a memory block.

As described above, the memory controller 110 updates the read history table 113 by applying a weight to an optimal read level set RD_otp based on the reliability parameter. Thus, since the updated read history table 113 is used at a following read operation, the memory controller 110 may have improved reliability and performance.

Figure 9:
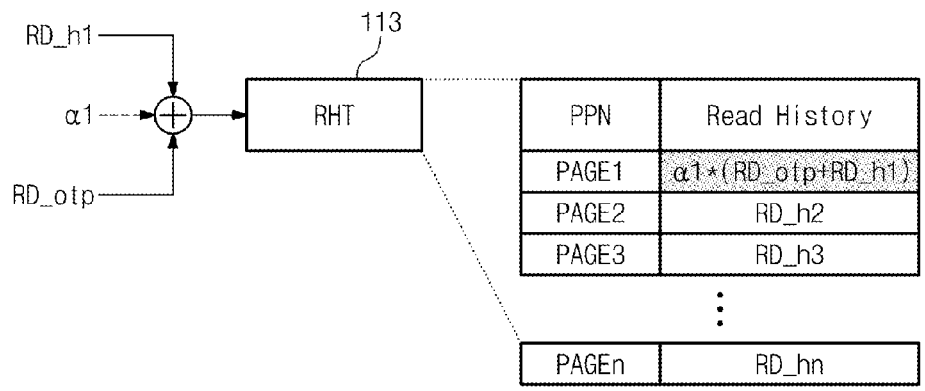
FIG. 9 is a diagram for describing a method for updating a read history table according to another exemplary embodiment of the application.

FIG. 9 is a diagram for describing a method for updating a read history table according to another exemplary embodiment of the application. Referring to FIGS. 1 and 9, a memory controller 110 detects an optimal read voltage set RD_otp based on an operating method that is described with reference to FIGS. 4 through 6.

Unlike an updating method described with reference to FIG. 8, the memory controller 110 updates the read history table 113 by applying a weight α1 to a history read voltage set RD_h1 and the detected optimal read voltage set RD_otp. As described with reference to FIG. 8, the weight α1 may be determined based on reliability parameters such as the number of error bits, an address, a temperature, a read count, and a P/E cycle. The read history table 113 is updated such that the weighted read voltage set α1*(RD_h1+RD_otp) corresponds to a first page PAGE1.

Figure 10:
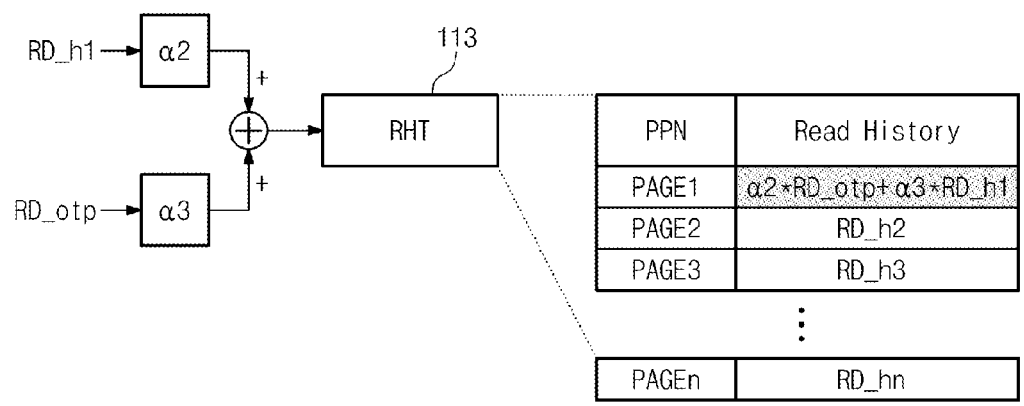
FIG. 10 is a diagram for describing a method for updating a read history table according to still another exemplary embodiment of the application.

FIG. 10 is a diagram for describing a method for updating a read history table according to still another exemplary embodiment of the application. Referring to FIGS. 1 and 10, a memory controller 110 detects an optimal read voltage set RD_otp based on an operating method that is described with reference to FIGS. 4 through 6.

Unlike an updating method described with reference to FIG. 8, the memory controller 110 updates the read history table 113 by applying different weights α2 and α3 to a history read voltage set RD_h1 and the detected optimal read voltage set RD_otp, respectively.

For example, the memory controller 110 determines the weights α2 and α3 based on the reliability parameter. The weights α2 and α3 may be applied to the history read voltage set RD_h1 and the detected optimal read voltage set RD_otp.

The reliability parameter may include the number of error bits. As the number of error bits increases, the reliability of the detected optimal read voltage set RD_otp may lower. On this occasion, the memory controller 110 may decrease the weight α3 to be applied to the optimal read voltage set RD_otp and may increase the weight α2 to be applied to the history read voltage set RD_h1.

In contrast, as the number of error bits decreases, the reliability of the detected optimal read voltage set RD_otp may be improved. On this occasion, the memory controller 110 may increase the weight α3 to be applied to the optimal read voltage set RD_otp and may decrease the weight α2 to be applied to the history read voltage set RD_h1.

For example, when the number of error bits of data read using the optimal read voltage set RD_otp is smaller than a reference value, the memory controller 110 may increase the weight α3 (i.e., greater than 0.5) to be applied to the optimal read voltage set RD_otp and may decrease the weight α2 (i.e., smaller than 0.5) to be applied to the history read voltage set RD_h1. At this time, in a ratio applied to a history read voltage of the updated read history table 113, the optimal read voltage set RD_otp may be higher than a previous history read voltage set RD_h1.

That is, as the memory controller 110 applies different weights according to the reliability of the detected optimal read voltage set RD_otp, the probability that read pass occurs upon performing a read operation based on the history read table 113 may become higher.

In exemplary embodiments, the reliability parameter may include various factors as described above, and the memory controller 110 may determine the weights α2 and α3 based on the reliability parameter.

Figure 12:
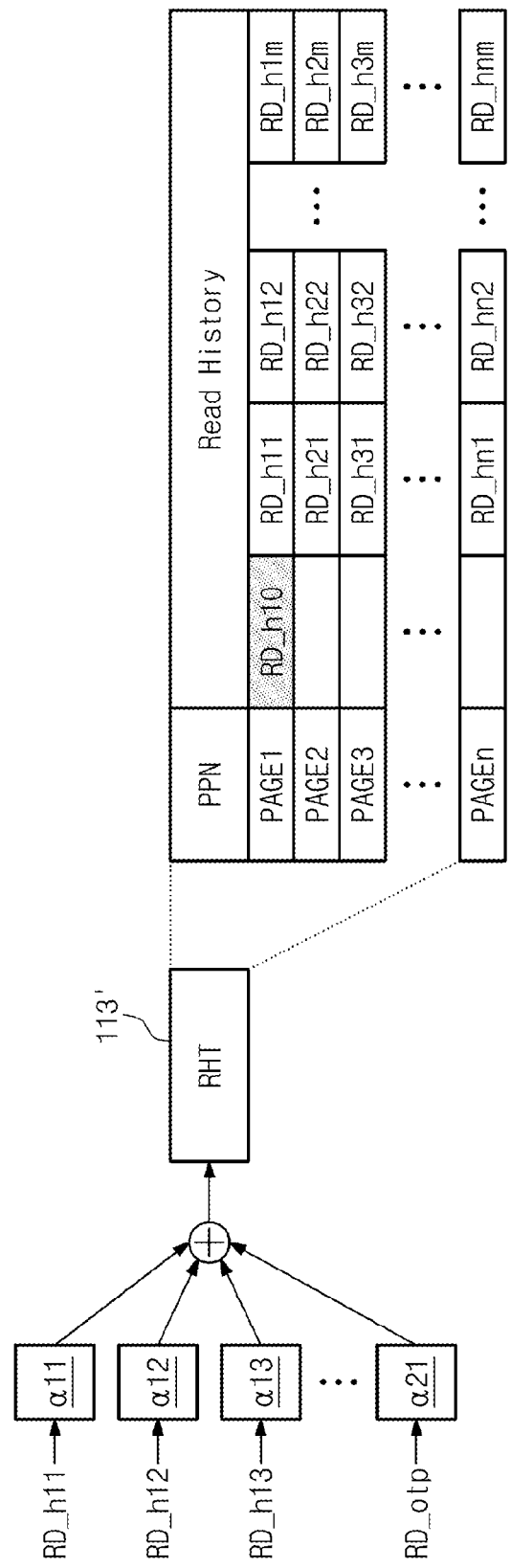

FIGS. 11 and 12 are diagrams for describing a method for updating a read history table according to still another exemplary embodiment of the application. Referring to FIGS. 1, 11 and 12, a read history table 113' contains a plurality of history read voltage sets RD_h11 through RD_hnm corresponding to a plurality of pages PAGE1 through PAGEn. For example, the read history table 113' contains history read level sets RD_h11 through RD_h1m associated with the first page PAGE1. The history read level sets RD_h11 through RD_h1m may be levels that are determined based on read level sets read-passed at a read operation about the first page PAGE1. In other words, the read history table 113' may include history read voltage sets that are associated with one page and are used for a plurality of read operations.

The memory controller 110 detects an optimal read voltage set RD_otp based on a method described with reference to FIGS. 4 through 6. As illustrated in FIG. 12, the memory controller 110 updates the read history table 113' by applying different weights α11 through α1m to the history read voltage sets RD_h11 through RD_h1m, respectively.

As described with reference to FIGS. 7 through 10, a read history table 113 is updated by applying a weight α to an optimal read voltage set RD_otp or a history read voltage set RD_h1. However, as described with reference to FIG. 12, the read history table 113' is updated by applying weights to an optimal read voltage set RD_otp and a plurality of previous history read voltage sets. Also, the memory controller 110 manages a plurality of history read voltage sets associated with a plurality of pages using the read history table 113'.

In exemplary embodiments, the history read voltage sets RD_h11 through RD_h1m may be shifted whenever the read history table 113' is updated. For example, the oldest history read voltage set RD_h1m is removed when a history read voltage set associated with the first page PAGE1 is updated. That is, the memory controller 110 may manage the predetermined number of history read voltage sets with respect to each page.

Figure 13:
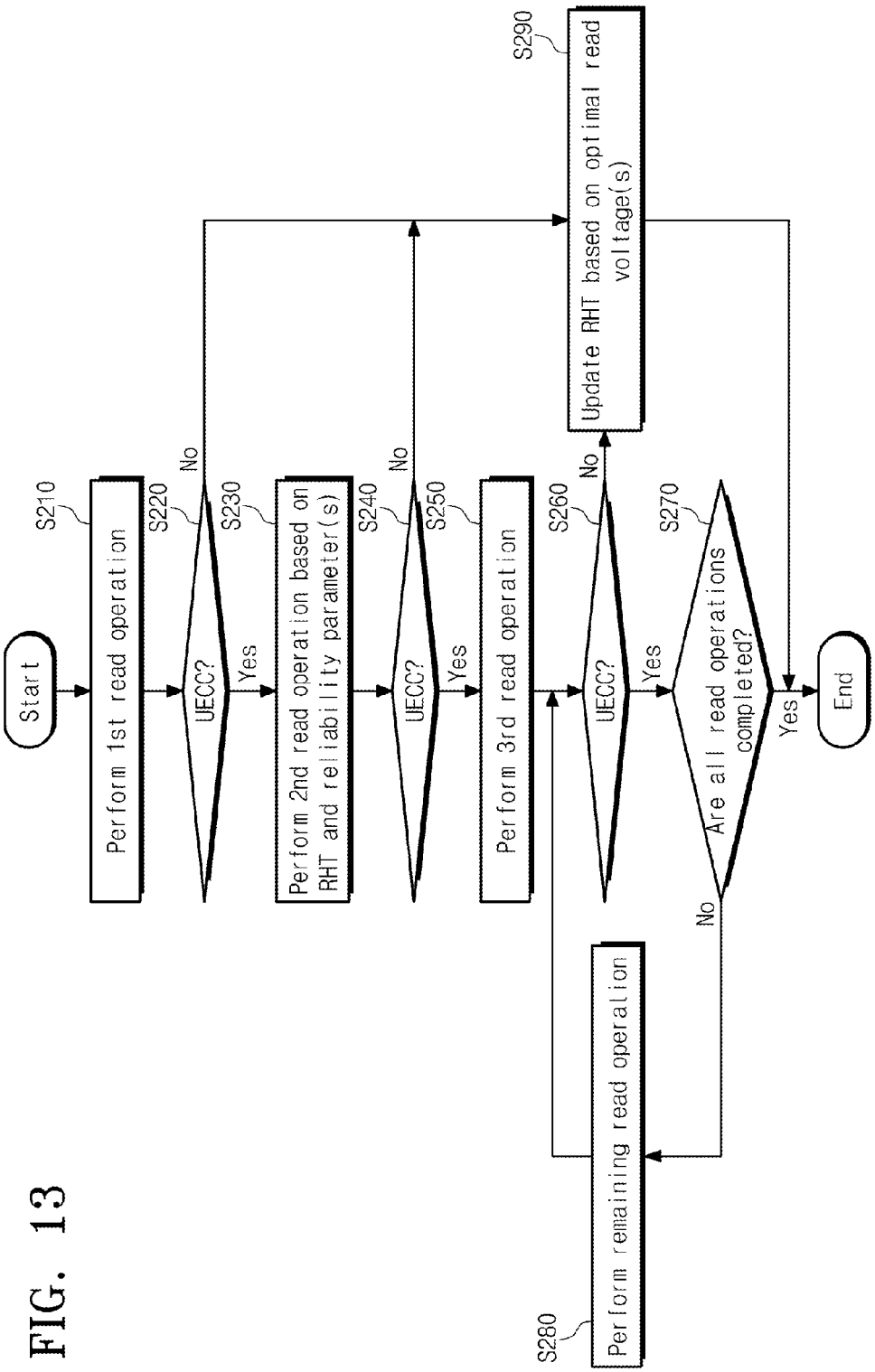
FIG. 13 is a flow chart showing an operating method of a memory controller according to still another exemplary embodiment of the application.

FIG. 13 is a flow chart showing an operating method of a memory controller according to still another exemplary embodiment of the application. Steps S210 and S220 shown in FIG. 13 may be the same as steps S110 and S120 shown in FIG. 4, and a detailed description thereof is thus omitted.

When data read through a first read operation is UECC data, in step S230, a memory controller 110 performs a second read operation based on a reliability parameter and a read history table 113. For example, the memory controller 110 may determine a history read voltage set corresponding to a first page PAGE1, based on the read history table 113.

The memory controller 110 may determine a weight based on the reliability parameter. For example, the memory controller 110 may determine a weight, based on a temperature of a nonvolatile memory device 120. The memory controller 110 may increase a weight as a temperature of the nonvolatile memory device 120 rises.

The memory controller 110 applies the weight to the history read voltage set thus determined and performs a second read operation using the weighted history read voltage set. Unlike step S130 shown in FIG. 4, in step S230, the memory controller 110 applies a weight to a history read voltage set RD_h1 to perform the second read operation.

Steps S240 through S280 shown in FIG. 13 may be the same as steps S140 through S180 shown in FIG. 4, and a detailed description thereof is thus omitted.

When read pass occurs in at least one of steps S220, S240, and S260, in step S290, the memory controller 110 updates the read history table 113 based on an optimal read voltage set RD_otp. At this time, unlike step S190 shown in FIG. 4, the memory controller 110 may not apply a weight.

As described above, the memory controller 110 performs the second read operation based on the read history table 113. The memory controller 110 does not update the read history table 113 based on an optimal read voltage set having an applied weight, but it applies a weight to a history read voltage set upon performing the second read operation based on the read history table 113 and performs the second read operation.

Figure 14:
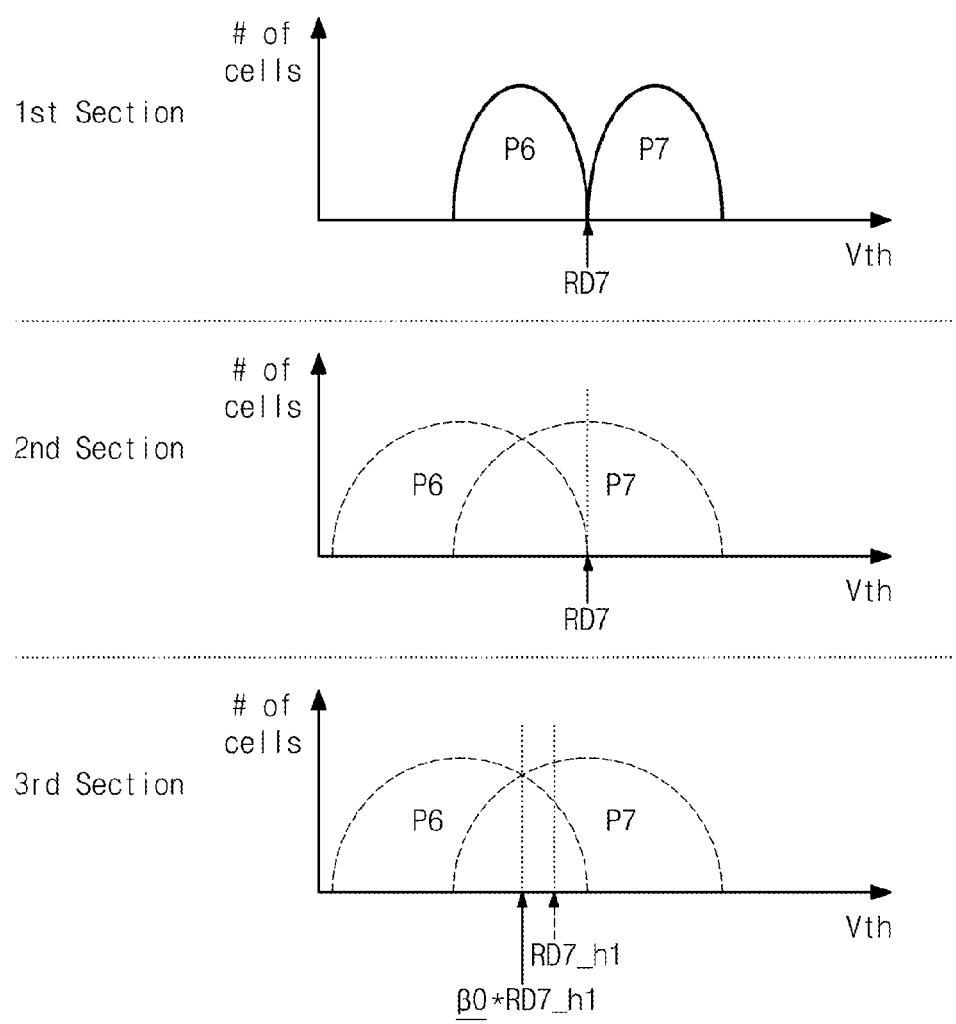
FIG. 14 shows distribution diagrams for describing an operating method of FIG. 13.

FIG. 14 shows distribution diagrams for describing an operating method of FIG. 13. For the sake of easy understanding, a detailed description about configurations described with reference to FIGS. 5 and 6 is omitted. As illustrated in first and second sections of FIG. 14, a memory controller 110 performs a first read operation. The first and second sections of FIG. 14 are the same as those of FIG. 6, and a detailed description is thus omitted.

As illustrated in a third section of FIG. 14, the memory controller 110 selects a history read level RD7_h1 based on a read history table 113. At this time, unlike a first read operation described with reference to a third section of FIG. 6, the memory controller 110 applies a weight 130 to the selected history read level RD7_h1 based on a reliability parameter and performs a second read operation.

For example, the reliability parameter may include temperature information. When a temperature of a nonvolatile memory system 100 is high, threshold voltages of memory cells may lower. On this occasion, the memory controller 110 makes the weight 130 small such that a read level to be used for the second read operation decreases. Likewise, the reliability parameter may include the following information: the number of error bits, a P/E count, a temperature, a read count, and an address. A value of the weight associated with the reliability parameter is described with reference to FIGS. 4 through 11, and a detailed description is thus omitted.

As described above, the memory controller 110 determines a history read voltage set RD_h based on the read history table 113 and performs a second read operation based on the determined history read voltage set RD_h. At this time, the memory controller 110 applies a current reliability parameter-based weight to the history read voltage set RD_h and performs the second read operation, thereby increasing the probability that read pass occurs. This may mean that the reliability and performance of a nonvolatile memory system are improved.

Figure 15:
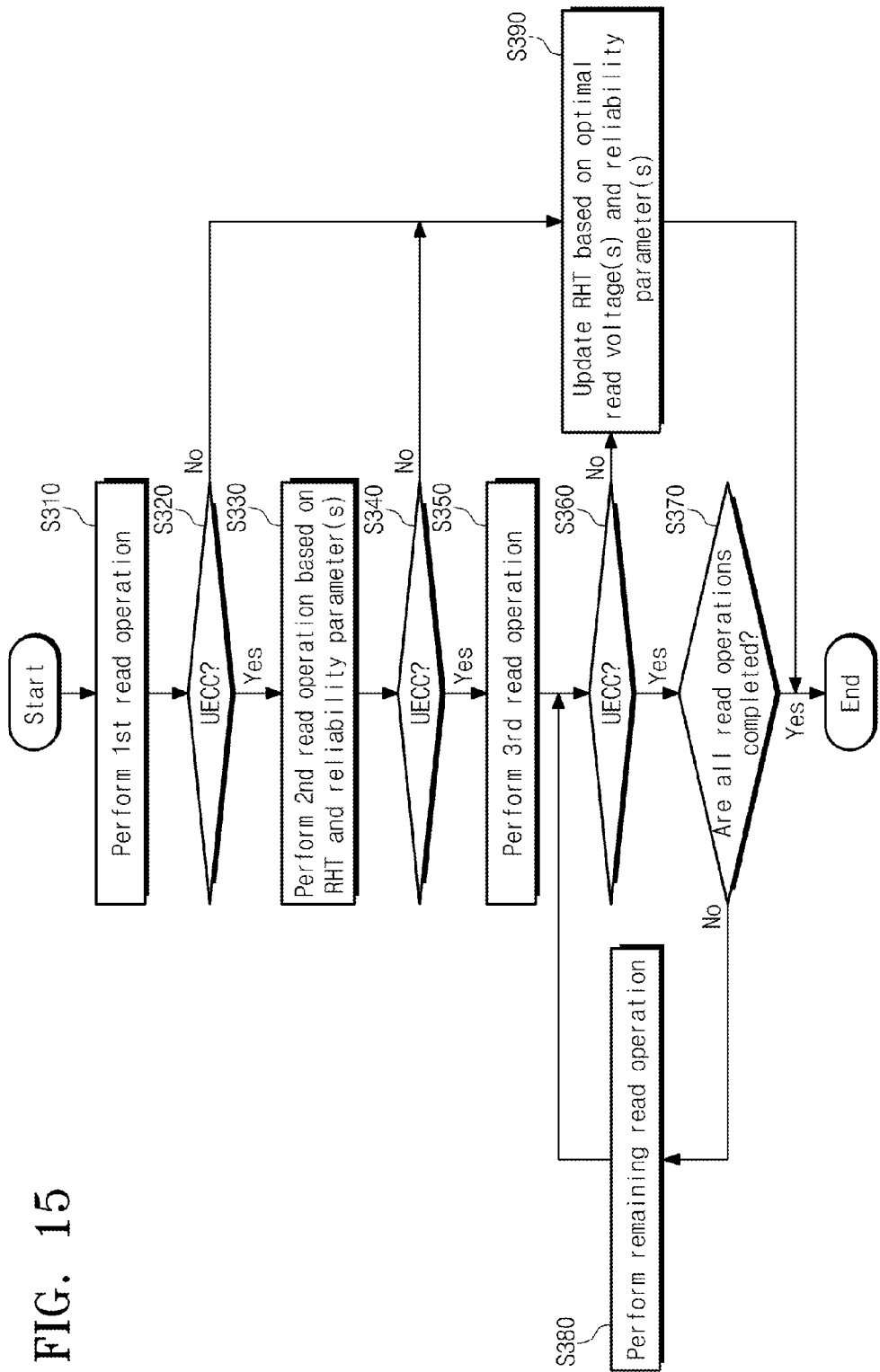
FIG. 15 is a flow chart showing an operating method of a memory controller according to still another exemplary embodiment of the application.

FIG. 15 is a flow chart showing an operating method of a memory controller according to still another exemplary embodiment of the application. Steps S310 and S320 shown in FIG. 15 may be the same as steps S110 and S120 shown in FIG. 4, and a detailed description thereof is thus omitted.

In step S330, a memory controller 110 performs a second read operation based on a reliability parameter and a read history table 113. In exemplary embodiments, step S330 is the same as step S220 of FIG. 13.

Steps S340 through S380 are the same as steps S140 through S180 of FIG. 4.

When a read pass occurs in at least one of steps S320, S340, and S360, in step S390, the memory controller 110 updates the read history table 113 based on an optimal read voltage set and a reliability parameter. In exemplary embodiments, step S390 is the same as step S190 of FIG. 4.

As described above, the memory controller 110 performs a second read operation using the read history table 113. At this time, the memory controller 110 determines a history read voltage set RD_h from a read history table 113 and applies a weight, that is, a reliability parameter-based weight to the determined history read voltage set RD_h to perform the second read operation. When a read pass occurs during a read operation, the read history table 113 is updated by applying a reliability parameter-based weight to the optimal read voltage set. Thus, the performance and reliability of a nonvolatile memory system are improved.

Figure 16:
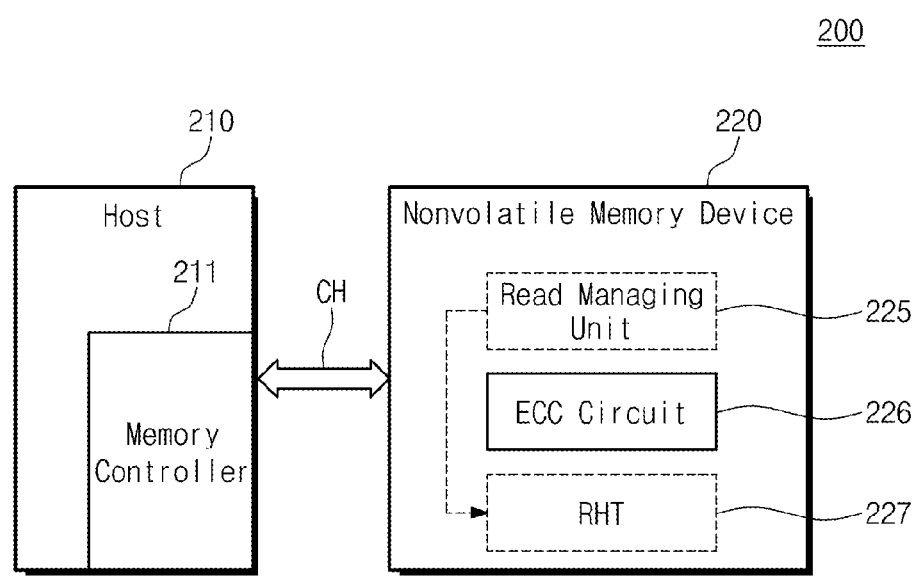
FIG. 16 is a block diagram schematically illustrating a nonvolatile memory system according to another exemplary embodiment of the application.

FIG. 16 is a block diagram schematically illustrating a nonvolatile memory system according to another exemplary embodiment of the application. Referring to FIG. 16, a nonvolatile memory system 200 contains a host 210 and a nonvolatile memory device 220.

The host 210 contains a memory controller 211. The memory controller 211 controls the nonvolatile memory device 220 such that data is stored at the nonvolatile memory device 220 or data is read from the nonvolatile memory device 220. For example, the host 210 exchanges signals with the nonvolatile memory device 220 through a channel CH. In exemplary embodiments, the channel CH may provide a signal transfer path that is defined by a NAND interface.

The nonvolatile memory device 220 stores or outputs data according to a control of the memory controller 211. Unlike a nonvolatile memory device 110 described with reference to FIGS. 1 through 15, the nonvolatile memory device 220 contains a read managing unit 225, an ECC circuit 226, and a read history table RHT 227. The read managing unit 225, ECC circuit 226, and read history table 227 are described with reference to FIGS. 1 through 15, and a detailed description thereof is thus omitted.

That is, the nonvolatile memory device 120 described with reference to FIGS. 1 through 15 sends data to a memory controller 110, and the memory controller 110 detects and corrects an error of received data. In contrast, the nonvolatile memory device 220 detects and corrects an error of data to send it to the memory controller 211. In other words, the nonvolatile memory device 220 receives a read request or a read command from the memory controller 211 and performs a read method of a memory controller described with reference to FIGS. 1 through 15 in response thereto. That is, the nonvolatile memory device 220 provides error-corrected data to the memory controller 211 or the host 210.

In exemplary embodiments, the nonvolatile memory device 220 may be implemented with one chip or one package. On this occasion, the nonvolatile memory device 220 may include an ECC circuit 226 and a separate storage circuit (not shown), and the read managing unit 225 and the read history table 227 may be stored at the separate storage circuit. The nonvolatile memory device 220 may be implemented with a storage device such as an Error-free NAND, a PPN (Perfect Page NAND), or a Managed NAND.

Figure 17:
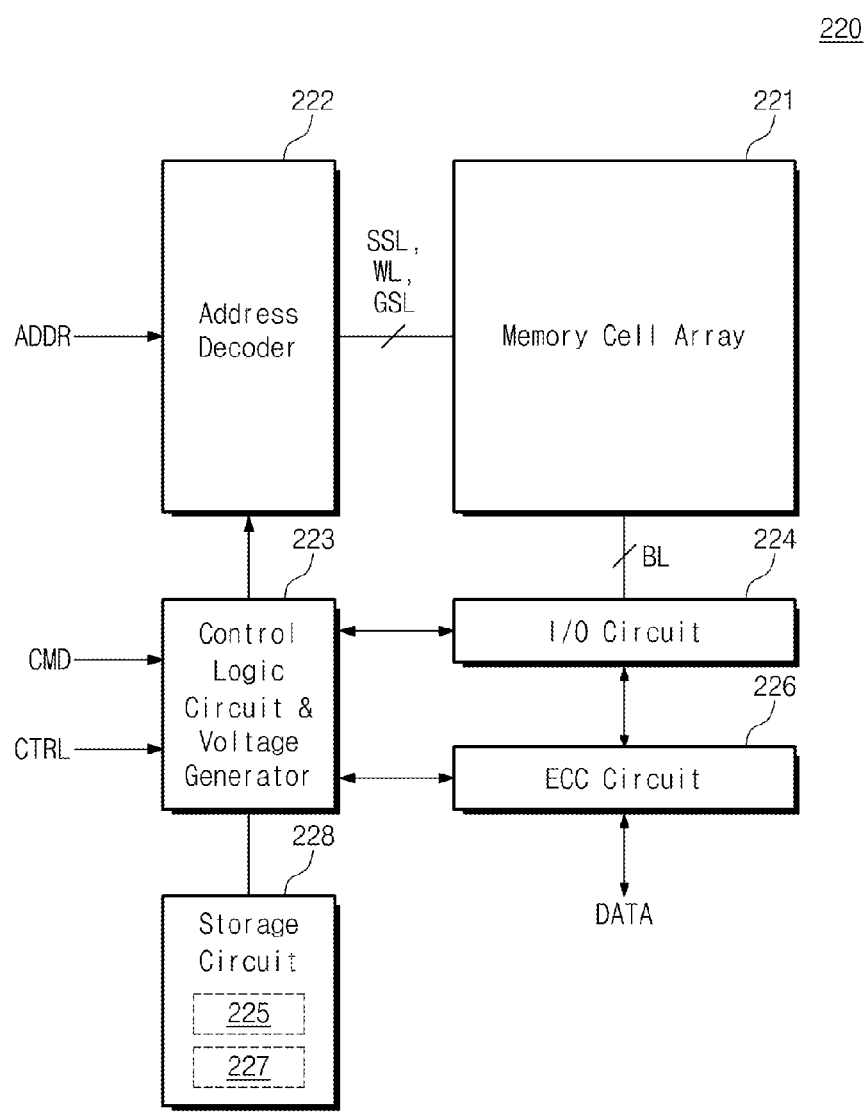
FIG. 17 is a block diagram schematically illustrating a nonvolatile memory device shown in FIG. 16.

FIG. 17 is a block diagram schematically illustrating a nonvolatile memory device shown in FIG. 16. Referring to FIGS. 16 and 17, a nonvolatile memory device 220 includes a memory cell array 221, an address decoder 222, a control logic circuit and voltage generator block 223, an input/output circuit 224, an ECC circuit 226, and a storage circuit 228.

The memory cell array 221, address decoder 222, control logic circuit and voltage generator block 223, and input/ output circuit 224 are described with reference to FIG. 3, and a detailed description thereof is thus omitted.

The ECC circuit 226 generates an error correction code associated with data received from a memory controller 211. The ECC circuit 226 provides the received data and the error correction code to the input/output circuit 224. The ECC circuit 226 receives the data and error correction code from the input/output circuit 224 and detects and corrects an error of the data using the error correction code. The ECC circuit 226 provides the error-corrected data to the memory controller 211.

Although not shown in FIG. 17, the ECC circuit 226 may be included in the input/output circuit 224.

The storage circuit 228 stores information needed for the nonvolatile memory device 220 to operate. For example, the read managing unit 225 and the read history table 227 may be implemented in the form of software and may be stored at the storage circuit 228. The read managing unit 225 may perform a read operation and a read history table updating operation described with reference to FIGS. 1 through 15. The read managing unit 225 stored at the storage circuit 228 may be driven by the control logic circuit and voltage generator block 223.

Although not shown in FIG. 17, the read managing unit 225 may be implemented in the form of hardware and may manage a read operation of the nonvolatile memory device 220.

As described above, the nonvolatile memory device 220 supports an error correction function. That is, the nonvolatile memory device 220 that is implemented in one chip or one package outputs error-corrected data in response to a request or command from an external device (e.g., memory controller, host, or application processor). At this time, the nonvolatile memory device 220 performs a read operation and a read history table updating operation that are described with reference to FIGS. 1 through 15. Thus, the reliability and performance of the nonvolatile memory device 220 may be improved.

Figure 18:
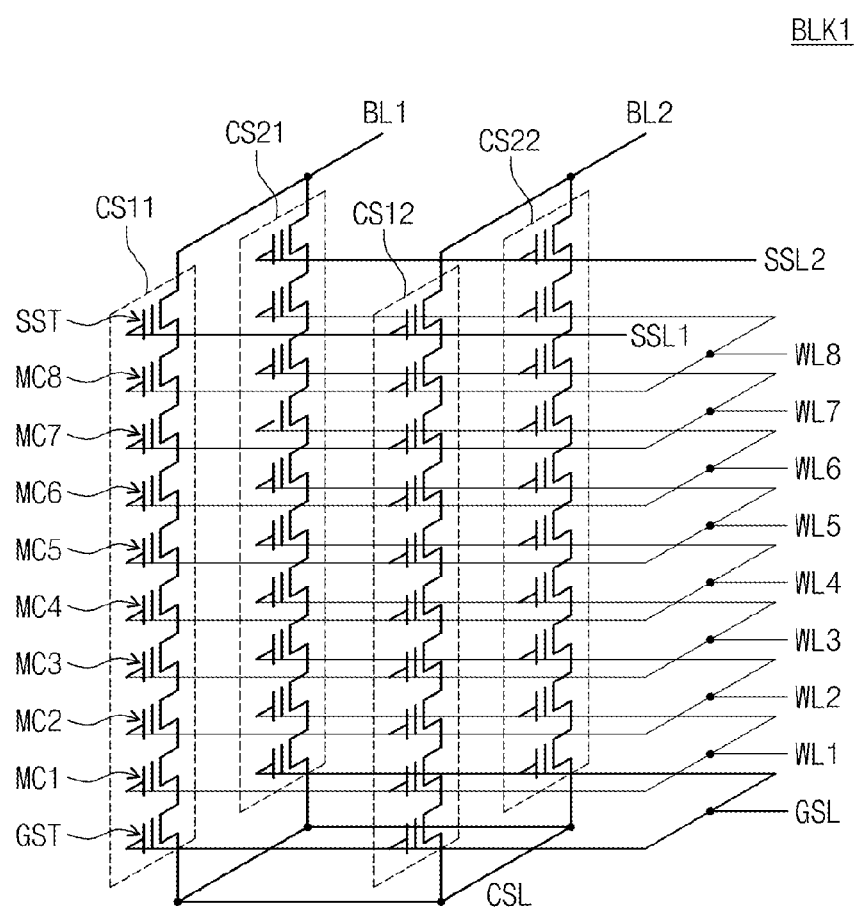
FIG. 18 is a circuit diagram schematically illustrating a first memory block of memory blocks of a nonvolatile memory device according to exemplary embodiments of the application.

FIG. 18 is a circuit diagram schematically illustrating a first memory block of memory blocks of a nonvolatile memory device according to exemplary embodiments of the application. An embodiment of the application is exemplified as a first memory block BLK1 having a three-dimensional vertical stack structure. Although not shown in FIG. 18, remaining memory blocks other than the first memory block BLK1 may be formed to be similar to the first memory block BLK1.

Referring to FIG. 18, the memory block BLK1 includes a plurality of cell strings CS11, CS12, CS21, and CS22. The cell strings CS11, CS12, CS21, and CS22 are arranged along a row direction and a column direction to form rows and columns.

Each of the cell strings CS11, CS12, CS21, and CS22 includes a plurality of cell transistors. In each cell string, the cell transistors include a string selection transistor SST, memory cells MC1 through MC8, and a ground selection transistor GST. In the cell strings CS11, CS12, CS21, and CS22, the string selection transistors SST are connected to a string selection line SSL. The string selection line SSL is divided into first and second string selection lines SSL1 and SSL2. In the cell strings CS11, CS12, CS21, and CS22, the memory cells MC1 through MC8 are connected to word lines WL1 through WL8. Word lines at the same height are interconnected. In the cell strings CS11, CS12, CS21, and CS22, the ground selection transistors GST are connected to a ground selection line GSL. Each cell string is connected between a bit line BL and a common source line CSL. That is, in each of the cell strings CS11, CS12, CS21, and CS22, the string selection transistor SST is connected to a bit line, and the ground selection transistor GST is connected to the common source line CSL.

Cell strings that are disposed at the same column are connected to the same bit line. For example, the cell strings CS11 and CS21 are connected to a first bit line BL1, and the cell strings CS12 and CS22 are connected to a second bit line BL2.

Cell strings that are disposed at the same row are connected to the same string selection line. For example, the cell strings CS11 and CS12 are connected to the first string selection line SSL1, and the cell strings CS21 and CS22 are connected to the second string selection line SSL2.

In exemplary embodiments, each of the cell strings CS11, CS12, CS21, and CS22 may be stacked in a direction perpendicular to a substrate (not shown). For example, the ground selection transistor GST, the memory cells MC1 through MC8, and the string selection transistor SST are formed to be stacked in a direction perpendicular to the substrate. For example, each memory cell may be a CTF (Charge Trap Flash) memory cell.

The memory block BLK1 shown in FIG. 18 is exemplary, not limiting the spirit and scope of the application. For example, the number of rows of cell strings may increase or decrease. As the number of rows of cell strings is changed, the number of string selection lines or ground selection lines connected with rows of cell strings and the number of cell strings connected to a bit line are also changed.

The number of columns of cell strings may increase or decrease. As the number of columns of cell strings is changed, the number of bit lines connected with columns of cell strings and the number of cell strings connected to a string selection line are also changed.

A height of a cell string may increase or decrease. For example, the number of memory cells included in each cell string may increase or decrease. As the number of memory cells included in each cell string is changed, the number of word lines is also changed. For example, the number of string selection transistors or ground selection transistors that each cell string includes may increase. As the number of string selection transistors or ground selection transistors that each cell string includes is changed, the number of string selection lines or ground selection lines is also changed. When the number of string selection lines or ground selection lines increases, string selection transistors or ground selection transistors may be stacked in the same manner as memory cells MC1 through MC8.

In exemplary embodiments, writing and reading may be performed by a unit of a row of cell strings CS11, CS21, CS12, and CS22. The cell strings CS11, CS21, CS12, and CS22 are selected by the row by activating the string selection lines SSL1 and SSL2 selectively.

Writing and reading about a selected row of cell strings CS11, CS21, CS12, and CS22 is performed by the page. A page may be a row of memory cells connected with a word line. In a selected row of cell strings CS11, CS21, CS12, and CS22, memory cells may be selected by the page by activating word lines WL1 through WL8 selectively. In exemplary embodiments, easing may be made by the memory block.

Figure 19:
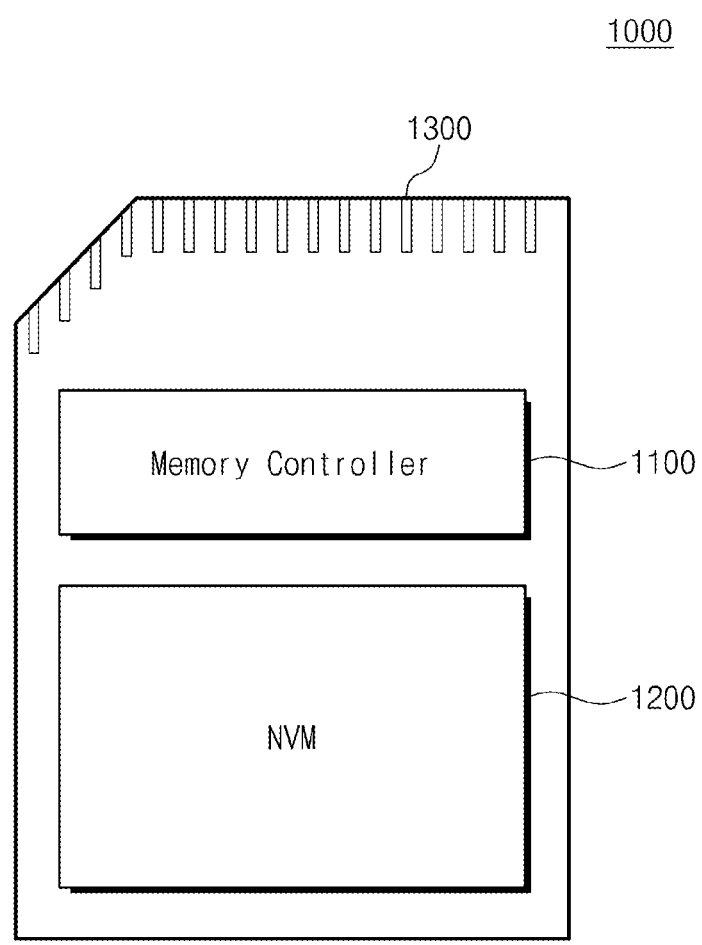
FIG. 19 is a block diagram schematically illustrating a memory card system including a nonvolatile memory system according to exemplary embodiments of the application.

FIG. 19 is a block diagram schematically illustrating a memory card system including a nonvolatile memory system according to exemplary embodiments of the application. Referring to FIG. 19, a memory card system 1000 contains a memory controller 1100, a nonvolatile memory 1200, and a connector 1300.

The memory controller 1100 is connected to the nonvolatile memory 1200. The memory controller 1100 is configured to access the nonvolatile memory 1200. For example, the memory controller 1100 may be adapted to control an overall operation of the nonvolatile memory 1200 including, but not limited to, a read operation, a write operation, an erase operation, and a background operation. The memory controller 1100 provides an interface between the nonvolatile memory 1200 and a host. The memory controller 1100 is configured to drive firmware for controlling the nonvolatile memory 1200.

In exemplary embodiments, the memory controller 1100 may include components such as, but not limited to, a RAM, a processing unit, a host interface, a memory interface, and an error correction unit.

The memory controller 1100 communicates with an external device through the connector 1300. The memory controller 1100 communicates with an external device according to a particular communication protocol. For example, the memory controller 1100 may communicate with the external device through at least one of various interface protocols such as, but not limited to, universal serial bus (USB), multimedia card (MMC), eMMC (embedded MMC), peripheral component interconnection (PCI), PCI-express (PCI-E), advanced technology attachment (ATA), a serial-ATA protocol, parallel-ATA, small computer small interface (SCSI), enhanced small disk interface (ESDI), integrated drive electronics (IDE), UFS (Universal Flash Storage), WiFi, Bluetooth, NVMe, and Firewire.

In exemplary embodiments, the memory controller 1100 may be a memory controller described with reference to FIGS. 1 through 15. The memory controller 1100 reads data stored at the nonvolatile memory 1200 based on an operating method described with reference to FIGS. 1 through 15.

In exemplary embodiments, the nonvolatile memory 1200 may be implemented with a variety of nonvolatile memory devices, such as, but not limited to, an EPROM (Electrically Erasable and Programmable ROM), a NAND flash memory, a NOR flash memory, a PRAM (Phase-change RAM), an ReRAM (Resistive RAM), a FRAM (Ferroelectric RAM), and an STT-MRAM (Spin-Torque Magnetic RAM).

In exemplary embodiments, the memory controller 1100 and the nonvolatile memory 1200 may be integrated in a single semiconductor device. The memory controller 1100 and the nonvolatile memory 1200 may be integrated in a single semiconductor device to form a solid state drive (SSD). The memory controller 1100 and the nonvolatile memory 1200 may be integrated in a single semiconductor device to form a memory card such as, but not limited to, a PC card (PCMCIA, personal computer memory card international association), a compact flash card (CF), a smart media card (SM, SMC), a memory stick, a multimedia card (MMC, RS-MMC, MMCmicro), an SD card (SD, miniSD, microSD, SDHC), and a universal flash storage.

The nonvolatile memory 1200 or the memory card system 1000 may be packaged according to any of a variety of different packaging technologies. Examples of such packaging technologies may include the following: PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

Figure 20:
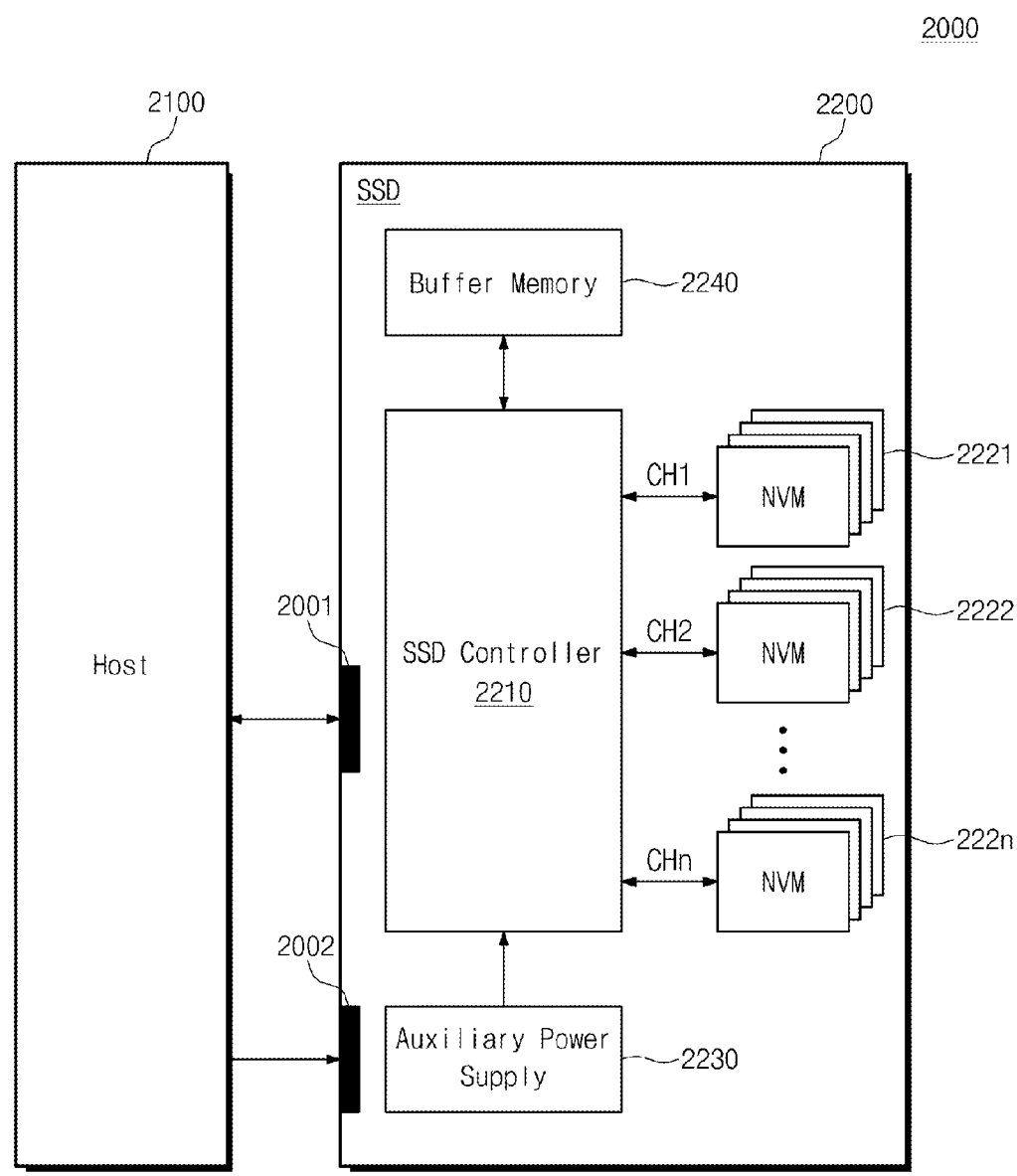
FIG. 20 is a block diagram illustrating a solid state drive including a nonvolatile memory system according to an exemplary embodiment of the application.

FIG. 20 is a block diagram illustrating a solid state drive including a nonvolatile memory system according to an exemplary embodiment of the application. Referring to FIG. 20, a solid state drive (SSD) system 2000 comprises a host 2100 and an SSD 2200. The SSD 2200 exchanges signals SGL with the host 2100 through the host interface 2001 and is supplied with power through a power connector 2002. The SSD 2200 comprises a plurality of flash memories 2221 to 222n, an SSD controller 2210, an auxiliary power supply 2230, and a buffer memory 2240.

The SSD controller 2210 controls the nonvolatile memories 2221 through 222n in response to a signal SIG received from the host 2100. In exemplary embodiments, the SSD controller 2210 may be a memory controller described with reference to FIGS. 1 through 15.

The auxiliary power supply 2230 is connected to the host 2100 via the power connector 2002. The auxiliary power supply 2230 is charged by power PWR from the host 2100. When power is not smoothly supplied from the host 2100, the auxiliary power supply 2230 powers the SSD system 2000. The auxiliary power supply 2230 may be placed inside or outside the SSD 2200. For example, the auxiliary power supply 2230 may be put on a main board to supply auxiliary power to the SSD 2200.

The buffer memory 2240 acts as a buffer memory of the SSD 2200. For example, the buffer memory 2240 temporarily stores data received from the host 2100 or from the flash memories 2221 to 222n, or it temporarily stores metadata (e.g., mapping tables) of the flash memories 2221 to 222n. The buffer memory 2240 may include volatile memories such as DRAM, SDRAM, DDR SDRAM, LPDDR SDRAM, and SRAM or nonvolatile memories such as FRAM ReRAM, STT-MRAM, and PRAM.

In exemplary embodiments, the SSD controller 2210 may read data stored at the flash memories 2221 through 222n based on an operating method described with reference to FIGS. 1 through 15. In exemplary embodiments, a read managing unit and a read history table described with reference to FIGS. 1 through 15 may be stored at the buffer memory 2240 and may be driven by the SSD controller 2210. Alternatively, a read managing unit and a read history table described with reference to FIGS. 1 through 15 may be stored and driven at a cache memory (not shown) of the SSD controller 2210.

Figure 21:
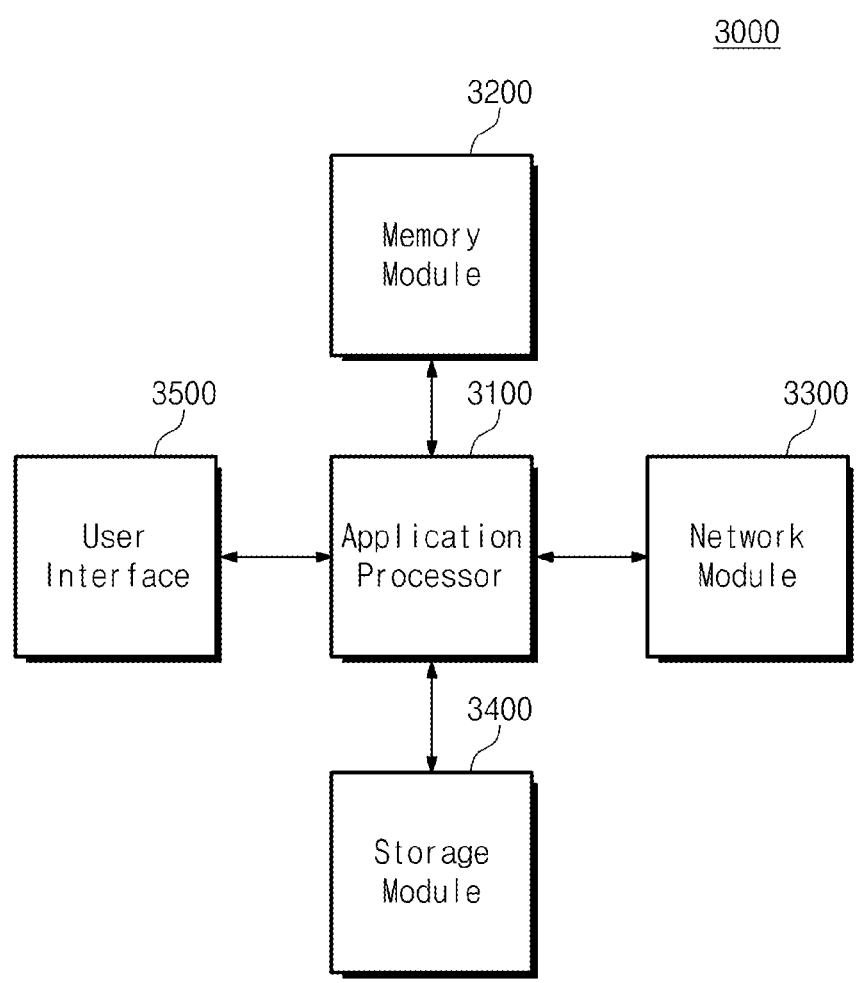
FIG. 21 is a block diagram schematically illustrating a user system including a nonvolatile memory system according to an exemplary embodiment of the application.

FIG. 21 is a block diagram schematically illustrating a user system including a nonvolatile memory system according to an exemplary embodiment of the application. Referring to FIG. 21, a user system 3000 includes an application processor 3100, a memory module 3200, a network module 3300, a storage module 3400, and a user interface 3500.

The application processor 3100 drives components of the user system 3000, an operating system, and so on. For example, the application processor 3100 may include controllers for controlling components of the user system 3000, graphics engines, a variety of interfaces, and so on. The application processor 3100 may be implemented with a system-on-chip (SoC).

The memory module 3200 operates as a main memory, a working memory, a buffer memory, or a cache memory of the user system 3000. The memory module 3200 may be implemented with a volatile random access memory, such as DRAM (Dynamic Random Access Memory), SDRAM (Synchronous DRAM), DDR SDRAM (Double Date Rate SDRAM), DDR2 SDRAM, DDR3 SDRAM, LPDDR DRAM, LPDDR2 DRAM, or LPDDR3 DRAM or a nonvolatile random access memory, such as PRAM (Phase-change RAM), MRAM (Magnetic RAM), RRAM (Resistive RAM), or FRAM (Ferroelectric RAM). In exemplary embodiments, the application processor 3100 and the memory module 3200 are packed in a semiconductor package depending on the POP (Package on Package).

The network module 3300 communicates with external devices. For example, the network module 3300 may support wireless communications, such as CDMA (Code Division Multiple Access), GSM (Global System for Mobile communication), WCDMA (wideband CDMA), CDMA-2000, TDMA (Time Division Multiple Access), LTE (Long Term Evolution), Wimax, WLAN, UWB, Bluetooth, WI-DI, and so on. As another embodiment, the network module 3300 may be embedded in the application processor 3100.

The storage module 3400 stores data. For example, the storage module 3400 stores data received from the application processor 3100. Alternatively, the storage module 3400 provides the application processor 3100 with data stored therein. For example, the storage module 3400 may be implemented with a nonvolatile semiconductor memory device such as PRAM, MRAM, RRAM, NAND flash memory, NOR flash memory, or a three-dimensional NAND flash memory.

In exemplary embodiments, the storage module 3400 may be a nonvolatile memory system described with reference to FIGS. 1 through 15. The storage module 3400 reads data based on an operating method described with reference to FIGS. 1 through 15. In other exemplary embodiments, the storage module 3400 may be a nonvolatile memory device 220 described with reference to FIGS. 16 and 17. In this case, the application processor 3100 may include a memory controller, and the storage module 3400 may output error-corrected data according to a control of the application processor 3100.

The user interface 3500 may provide interfaces for providing data or commands to the application processor 3100 or for outputting data to an external device. For example, the input interface 3500 may include user input interfaces, such as a key board, a key pad, a button, a touch panel, a touch screen, a touch pad, a touch ball, a camera, a microphone, a Gyroscope, a vibration sensor, and a piezoelectric element. The input interface 3500 may include user output interfaces, such as an LCD (Liquid Crystal Display) device, an OLED (Organic Light Emitting Diode) display device, an AMO-LED (Active Matrix OLED) display device, an LED, a speaker, and a motor.

In accordance with exemplary embodiments of the application, a nonvolatile memory system (or, storage device) may perform a read operation based on history read levels. At this time, the nonvolatile memory system may detect an optimal read level and applies a weight to the optimal read level to update a read history table. The above-described weight may be determined based on the following reliability parameters of the nonvolatile memory system: the number of error bits of data read using an optimal read level, a temperature, a P/E cycle, a read count, and an address. Afterwards, the probability that read pass occurs at a read operation using the history read level may increase. Thus, it is possible to provide a nonvolatile memory system with improved reliability and performance and an operating method thereof.

While the application has been described with reference to exemplary embodiments, it will be apparent to those skilled in the art that various changes and modifications may be made without departing from the spirit and scope of the application. Therefore, it should be understood that the above embodiments are not limiting, but illustrative.

What is claimed is:

1. An operating method of a nonvolatile memory system which includes a nonvolatile memory having a plurality of pages and a memory controller configured to read data stored on at least one of the pages based on a plurality of read voltages, the operating method comprising:
   receiving a read request on the at least one page from a host;
   adjusting, in response to the read request, the read voltages based on a previous read history table to perform a first read operation in which data stored at the nonvolatile memory is read;
   detecting an optimal read voltage set, in response to determining that data read according to the first read operation includes an uncorrectable error; and
   updating the previous read history table to generate a current read history table, based on a reliability parameter indicating a characteristic of the nonvolatile memory or a characteristic of the data at the first or second read operation, the optimal read voltage set, and the previous read history table.

2. The operating method of claim 1, wherein the reliability parameter includes at least one of a number of error bits of data read using the optimal read voltage set, a temperature of the nonvolatile memory, a program/erase (P/E) cycle of the nonvolatile memory, an address indicating a position of the at least one page, or a read count of the at least one page.

3. The operating method of claim 1, wherein:
   the previous read history table includes information associated with history read voltage sets corresponding to each of the pages, and
   the adjusting of the read voltages includes:
      selecting a history read voltage set corresponding to the at least one page;
      adjusting the read voltages with the selected history read voltage set; and
      reading the at least one page using the adjusted read voltages.

4. The operating method of claim 3, wherein the history read voltage set indicates a read voltage set that is read-passed at a read operation performed before the read request.

5. The operating method of claim 3, wherein the updating of the previous read history table includes updating the previous read history table by applying a first weight, which depends on the reliability parameter to the optimal read voltage set and applying at least one second weight to at least one history read voltage set associated with the at least one page.

6. The operating method of claim 5, wherein the at least one second weight decreases when the first weight increases and increases when the first weight decreases.

7. The operating method of claim 1, wherein the detecting of the optimal read voltage set includes:
   reading the at least one page at least twice; and
   detecting the optimal read voltage set based on a result of reading the at least one page at least twice.

8. The operating method of claim 1, wherein the detecting of the optimal read voltage set includes detecting the optimal read voltage set based on a predetermined table including a plurality of read voltage sets.

9. The operating method of claim 1, further comprising:
   receiving another read request associated with the at least one page from the host; and adjusting, in response to the second read request, the read voltages based on the current read history table to read the data.

10. The operating method of claim 1, wherein the previous read history table and the current read history table is managed by one selected from a group of a plane unit, a memory block unit, a sub block unit, a word line unit, and a page unit of the nonvolatile memory device.

11. The operating method of claim 1, wherein the nonvolatile memory includes a three-dimensional memory array comprising a plurality of memory cells, each of the memory cells including a charge trap layer.

12. An operating method of a memory controller which controls a nonvolatile memory, the operating method comprising:
reading data stored at the nonvolatile memory based on a plurality of read voltages;
adjusting, in response to determining that the data includes an uncorrectable error, the read voltages based on a previous read history table and a first reliability parameter to read the data using the adjusted read voltages;
detecting an optimal read voltage set in response to determining that data read using the adjusted read voltages includes an uncorrectable error; and
updating the previous read history table to generate a current read history table, based on the detected optimal read voltage set, a second reliability parameter, and the previous read history table.

13. The operating method of claim 12, wherein:
the first reliability parameter includes at least one of a number of error bits of data read using the read voltages, a temperature of the nonvolatile memory, a program/erase (P/E) cycle of the nonvolatile memory, an address indicating a position of the at least one page, or a read count of the at least one page; and
the second reliability parameter includes at least one of a number of error bits of data read using the optimal read voltage set, the temperature of the nonvolatile memory, the program/erase (P/E) cycle of the nonvolatile memory, the address indicating the position of the at least one page, or the read count of the at least one page.

14. The operating method of claim 12, wherein:
the previous read history table includes information associated with history read voltage sets corresponding to an area where the data is stored, and
the adjusting of the read voltages includes applying a weight, based on the first reliability parameter, to the history read voltage sets to adjust the read voltages.

15. The operating method of claim 12, wherein data read using the optimal read voltage set is normal data or data including a correctable error.

16. The operating method of claim 12, wherein the optimal read voltage set is detected by sequentially performing read operations based on a predetermined table including a plurality of read voltage sets.

17. The operating method of claim 12, wherein the detecting of an optimal read voltage set includes:
reading the data at least twice using different read voltage sets; and
detecting the optimal read voltage set based on a result of the reading the data at least twice.

18. An operating method of a nonvolatile memory device which includes a plurality of pages and an error correction circuit configured to correct an error of data, the operating method comprising:
receiving a read command from a memory controller;
reading, in response to the read command, data stored on at least one of the pages based on a plurality of read voltages;
adjusting, in response to determining that the data includes an error uncorrectable by the error correction circuit, the read voltages based on a previous read history table to read data stored at the at least one page using the adjusted read voltages;
detecting an optimal read voltage set in response to determining that data read using the adjusted read voltages includes an error uncorrectable by the error correction circuit; and
updating the previous read history table to generate a current read history table, based on the detected optimal read voltage set, a reliability parameter, and the previous read history table.

19. The operating method of claim 18, wherein the reliability parameter includes at least one of a number of error bits of data read using the optimal read voltage set, a temperature of the nonvolatile memory, a program/erase (P/E) cycle of the nonvolatile memory, an address indicating a position of the at least one page, or a read count of the at least one page.

20. The operating method of claim 18, further comprising:
sending one piece of data to the memory controller, in response to determining that the one piece of the read data includes a correctable error or normal data.

* * * * *